US008503292B2

(12) United States Patent
Nagano et al.

(10) Patent No.: US 8,503,292 B2
(45) Date of Patent: Aug. 6, 2013

(54) DATA TRANSFER SYSTEM, A RECEPTION DEVICE OF THE DATA TRANSFER SYSTEM AND A CONTROL METHOD OF THE DATA TRANSFER SYSTEM

(75) Inventors: Tomohiro Nagano, Kawasaki (JP); Ryuji Iwatsuki, Kawasaki (JP); Kazumi Hayasaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 379 days.

(21) Appl. No.: 13/034,168

(22) Filed: Feb. 24, 2011

(65) Prior Publication Data
US 2011/0228861 A1  Sep. 22, 2011

(30) Foreign Application Priority Data
Mar. 18, 2010  (JP) ................................. 2010-061947

(51) Int. Cl.
*H04L 1/00* (2006.01)
(52) U.S. Cl.
USPC .......................................... 370/225; 375/259
(58) Field of Classification Search
USPC .......................................................... 370/225
See application file for complete search history.

(56) References Cited

U.S. PATENT DOCUMENTS
2006/0153069 A1 * 7/2006 Lund et al. ..................... 370/225
2008/0300992 A1 * 12/2008 Wang et al. ..................... 705/16

FOREIGN PATENT DOCUMENTS
| EP | 1 598 742 A1 | 11/2005 |
| EP | 2 131 514 A2 | 12/2009 |
| JP | 2-234254 | 9/1990 |
| JP | 5-173922 | 7/1993 |
| JP | 5-250317 | 9/1993 |
| JP | 5-257871 | 10/1993 |

OTHER PUBLICATIONS

European Search Report dated Jul. 25, 2011 in corresponding European Patent Application 11155673.4.

* cited by examiner

*Primary Examiner* — Yemane Mesfin
*Assistant Examiner* — Wanda Z Russell
(74) *Attorney, Agent, or Firm* — Staas & Halsey LLP

(57) ABSTRACT

A data transfer system transfers data via a plurality of signal lines and controls to select the signal lines to adapt reduction and lane reversal. The signal line control unit has a signal creation unit that creates a first selection signal when the signal lines are reduced according to the abnormal detection from the abnormal detection unit, and a signal output unit that outputs a second selection signal when a connection of the second selection signal indicating that any one or both signal line of a second pair of signal lines is changed in case of a lane reversal that connects a plurality of signal lines in a down order from a highest bit to a lowest bit of a sending device side with a plurality of signal in a up order from a highest bit to a lowest bit of a reception device side.

20 Claims, 26 Drawing Sheets

FIG.4

| | LINK WIDTH | UTILIZATION LANE NUMBER | PRIORITY | CONDITION |
|---|---|---|---|---|
| A | x8 | #0-#7 | 1 | LANES #0~#7 are not failed |
| B | x4 | SELECT NO-FAILED LANE FROM EACH OF {#0,#4}, {#1,#5}, {#2,#6} AND {#3,#7} | 2 | ANY ONE OR BOTH OF {#0,#4}, {#1,#5}, {#2,#6} AND {#3,#7} IS OR ARE NOT FAILED |
| C | x4 | SELECT NO-FAILED LANE FROM EACH OF {#0,#7}, {#1,#6}, {#2,#5}, AND {#3,#4} | 3 | ANY ONE OR BOTH OF {#0,#7}, {#1,#6}, {#2,#5} AND {#3,#4} IS OR ARE NOT FAILED |

FIG.16 LINK CONSTRUCTION INSTRUCTION, SENDING TIMING CONTROL AND LANE REVERSAL FROM SIGNAL LINE CONTROLLER

FIG.20 RELATED ART

| | LINK WIDTH | UTILIZATION LANE NUMBER | PRIORITY | CONDITION |
|---|---|---|---|---|
| A | x8 | #0 - #7 | 1 | LANES #0-#7 are not failed |
| B | x4 | #0 - #3 | 2 | LANES #0-#3 are not failed |
| C | x4 | #4 - #7 | 3 | LANES #4-#7 are not failed |

FIG.23 RELATED ART

| | LINK WIDTH | UTILIZATION LANE NUMBER | PRIORITY | CONDITION |
|---|---|---|---|---|
| A | ×8 | #0-#7 | 1 | LANES #0-#7 are not failed |
| B | ×4 | #0-#3 | 2 | LANES #0-#3 are not failed |
| C | ×4 | #4-#7 | 2 | LANES #4-#7 are not failed |
| D | ×4 | #0,#1,#4,#5 | 3 | LANES #0,#1,#4,#5 are not failed |
| E | ×4 | #2,#3,#6,#7 | 3 | LANES #2,#3,#6,#7 are not failed |
| F | ×4 | #0,#1,#6,#7 | 3 | LANES #0,#1,#6,#7 are not failed |
| G | ×4 | #2,#3,#4,#5 | 3 | LANES #2,#3,#4,#5 are not failed |

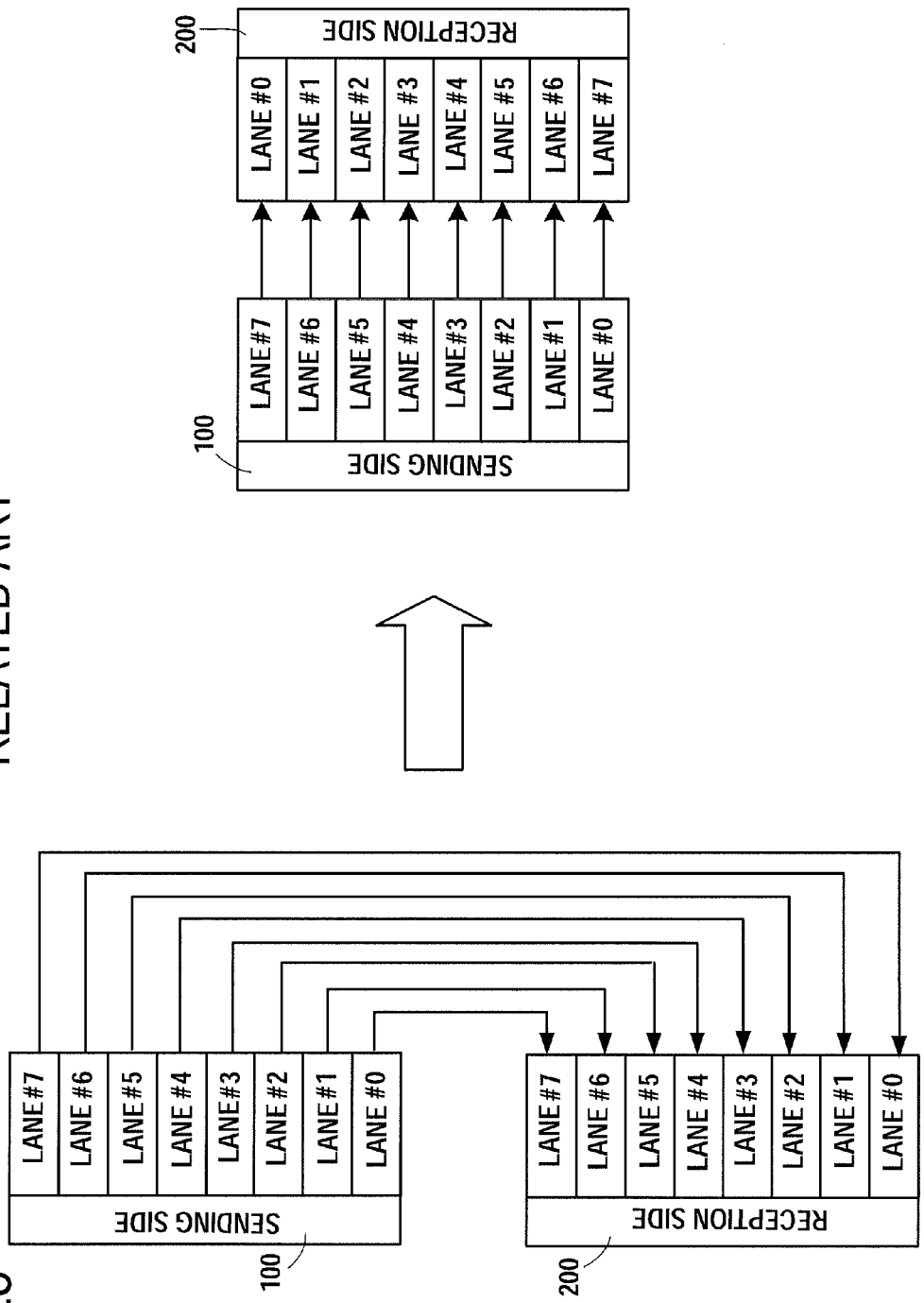

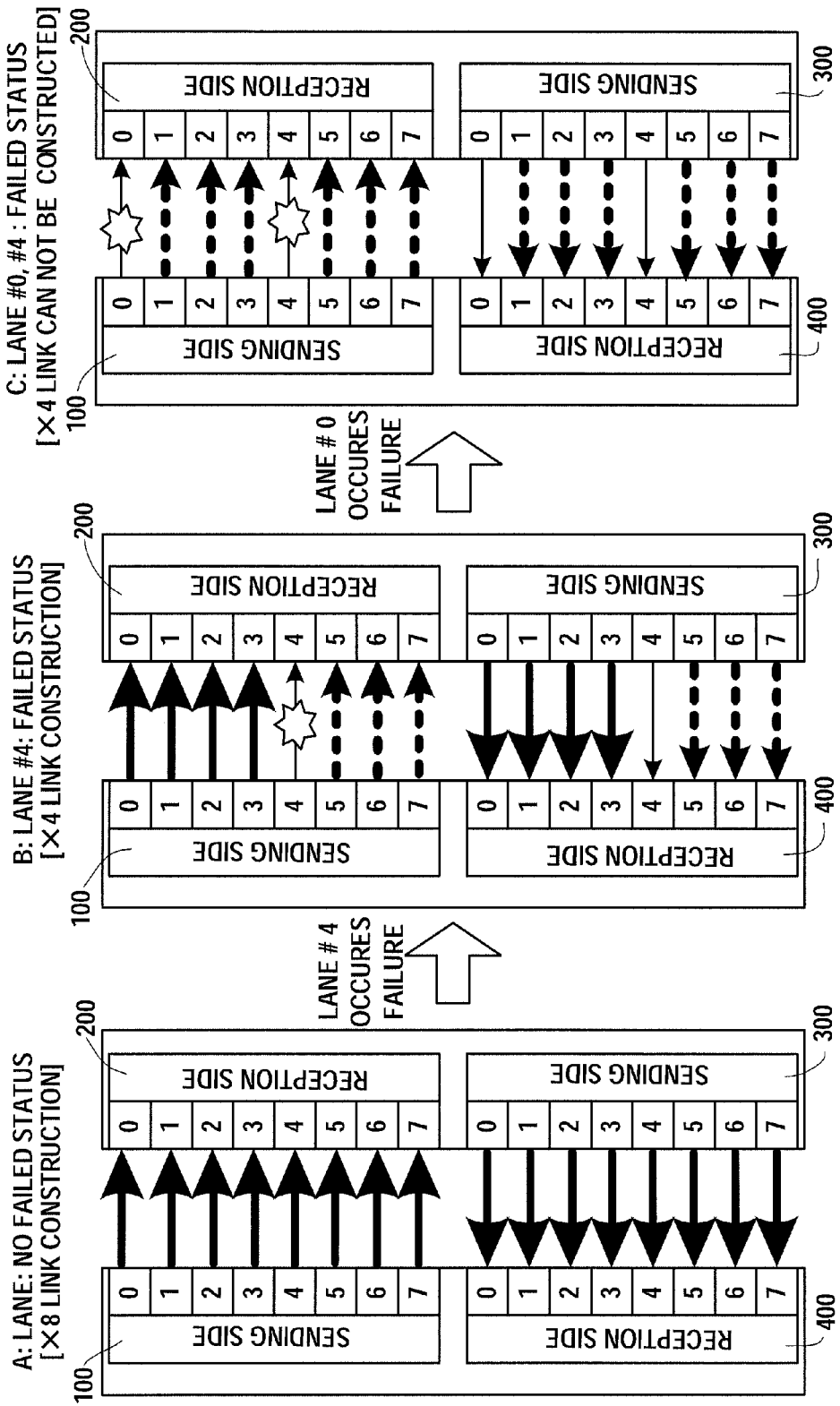

DATA TRANSFER SYSTEM, A RECEPTION DEVICE OF THE DATA TRANSFER SYSTEM AND A CONTROL METHOD OF THE DATA TRANSFER SYSTEM

CROSS-REFERENCE TO RELATED APPLICATION

This application is based upon and claims the benefit of priority of the prior Japanese Patent Application No. 2010-061947, filed on Mar. 18, 2010, the entire contents of which are incorporated herein by reference.

FIELD

The embodiments discussed herein are related to a data transfer system, a reception device of the data transfer device and a control method of the data transfer system.

BACKGROUND

When data are transferred between devices, in order to improve speed of the data transfer, a sending side sends data after dividing packets into a plurality of parallel signal lines and a reception side restores received data into original packets. In the data transfer, it is difficult to transfer data when one of the parallel signal lines is failed. Therefore, the data transfer continues by utilizing normal signal lines except the failed signal line.

FIG. 18~FIG. 21 illustrate diagrams that related arts are explained. FIG. 18 illustrates a data transfer control device that connects a sending signal line selection unit 102 of the sending device 100 with a reception signal line selection unit 202 of the reception device 200 via eight signal lines 300-0~300-7. However, a number of the signal lines is limited to eight.

In the sending device 100, the sending signal line selection unit 102 distributes serial sending data D0~D7 into parallel signal lines 300-0~300-7 via drivers 106-0~106-7. In the reception device 200, the reception signal line selection unit 202 receives the data D0~D7 through drivers 206-0~206-7 from the signal lines 300-0~300-7, arranges and converts into the serial data D0~D7 and outputs as reception data.

When such parallel signal lines are utilized, it is difficult to transfer data when any one of the eight signal line paths #0~#7 (the signal lines 300-0~300-7, the drivers 106-0~106-7 and the receivers 206-0~206-7) is failed. Therefore, it is proposed to divide the signal line path (called as lane as below) into two groups of [#0~#3] and [#4~#7] and manage whether failure signal line is existed in each group.

In FIG. 18, a signal line control unit 104 is provided to the sending device 100 and a failure detection circuit 208 and a signal line control unit 204 are provided to the reception device 200. The failure detection circuit 208 detects whether each signal line path (lane) is failed. The signal line control units 104 and 204 permits a selection of all signal lines to corresponding the signal line selection unit 102 and the reception signal line selection unit 202 when any one of each signal line path (lane) is not failed.

As illustrated in FIG. 19, when the failure detection circuit 208 detects the failure of single signal line (lane #5: a path of the signal line 300-5, the driver 106-5 and the receiver 206-5 in FIG. 19), the signal line control units 104 and 204 control that the signal line selection unit 102 and the reception signal line selection unit 202 separate the failure signal line #5 and not-failed signal lines (the lane #4, #6 and #7) within the group [#4~#7] belonging to the failure signal line #5 from the data transfer.

By the separation, the data transfer continues by using remaining four signal lines 300-0~300-3 to reduce the lane #0~#3. That is, the data transfer continues by reducing x4 link width construction from x8 link width construction. FIG. 20 and FIG. 21 illustrate a flow of the reduction. In x8 link width construction 'A' that all lanes of #0~#7 are not failed, when one lane is failed, the construction reduces x4 link width construction 'B' that utilizes lane #0~#3 if the lanes #0~#3 are not failed. As same as, when one lane is failed, the construction reduces x4 link width construction 'C' that utilizes lane #4~#7 if the lanes #4~#7 are not failed.

However, it is difficult to continue data transfer with the x4 link width construction that has half link width of x8 link width construction when one of four signal lines that is utilized for data transfer is failed.

FIG. 22, FIG. 23 and FIG. 24 illustrate diagrams of explanation in other related art. FIG. 22 illustrates an example of the bi-directional data transfer. That is, the sending unit 100 in the first device sends data to the reception unit 200 of the second device through lanes #0~#7 and the reception unit 400 of the first device receives the data from the sending unit 300 in the second device through the lanes #0~#7. The lane #0~#7 are same as an example in FIG. 18.

In this example, a number of combinations of four lanes are increased at the reduction. As illustrated in FIG. 23 and FIG. 24, in the x8 (eight) link width construction 'A' that all lanes of #0~#7 are not failed, when one lane is failed, the construction reduces x4 link width construction 'B' that utilizes lane #0~#3 if the lanes #0~#3 are not failed. As same as, when one lane is failed, the construction reduces x4 link width construction 'C' that utilizes lane #4~#7 if the lanes #4~#7 are not failed.

And in an example in FIG. 23, it is provided four patterns as the reduction patterns of four lanes. When one lane is failed in status that reduced x4 link width construction, in x4 link width construction 'B' which utilizes lanes #0~#3 or in x4 link width construction 'C' which utilizes lanes #4~#7, it is reduced to x4 link width construction 'D' that utilizes the lane #0, #1, #4, #5 when all lanes of #0, #1, #4, #5 are not failed. As same as, it is reduced to x4 link width construction 'E' that utilizes the lane #2, #3, #6, #7 when all lanes of #2, #3, #6, #7 are not failed. It is reduced to x4 link width construction 'F' that utilizes the lane #0 #1 #6, #7 when all lanes of #0, #1, #6, #7 are not failed. It is reduced to x4 link width construction 'G' that utilizes the lane #2, #3, #4, #5 when all lanes of #2, #3, #4, #5 are not failed.

For example, as illustrated in FIG. 22, when detecting the failure of single signal line (lane #4: a path of the signal line 300-4, the driver 106-4 and the receiver 206-4 in FIG. 22), the signal line control units 104 and 204 of the sending device and the reception device control that the signal line selection unit 102 and the reception signal line selection unit 202 separate the failure signal line #4 and not-failed signal lines (the lane #5, #6 and #7) within the group [#4~#7] belonging to the failure signal line #4 from the data transfer. By the separation, the data transfer continues by using remaining four signal lines 300-0~300-3 to reduce the lane #0~#3.

Further, when one lane #0 among four lanes #0~#3, that is utilized for data transfer, is failed, a pair lanes #6 and #7, that is non-failed signal lines in a separated group, are utilized and the failed lane #0 and its pair lane #1 are separated. In this timing, same lane change is achieved to the reception device 300 and the sending device 400.

In this way, it is possible to suppress the reduction width to half by selecting the signal line which is not utilized in the reduction even though two signal lines are failed among eight signal lines.

Patent Document 1: Japanese Laid-open Patent Publication No. 05-250317

Patent Document 2 Japanese Laid-open Patent Publication No. 05-173922

Patent Document 3 Japanese Laid-open Patent Publication No. 05-257871

Patent Document 4 Japanese Laid-open Patent Publication No. 02-234254

SUMMARY

Recently, LSI (Large Scale Integrated Circuit) and IC (Integrated Circuit) are mounted on a circuit board with a high density, so short wiring distance is required. For the requirement, lane reversal technique is effective. The lane reversal technique is a function of reversing the order of arrangement of the lane number in order that the wiring of a printed circuit is easy.

FIG. 25 illustrates a diagram of explanation of a lane reversal function. As illustrated in FIG. 18~FIG. 21, when the arrangement of the lane number in the sending side and the arrangement of the lane number in the reception side are same, the sending side 100 and the reception side 200 are connected so that the connected lane numbers are same. While, as illustrated in FIG. 25, when the sending device 100 and the reception device 200 are arranged in parallel position, the wiring becomes complex if the sending side 100 and the reception side 200 are connected so that the lane numbers are same. Therefore, the sending side 100 and the reception side 200 are connected so that the connected lane numbers are reverse.

In an example in FIG. 25, the lane #7~#0 of the sending device 100 are connected to the lane #0~#7 of the reception device 200. By this connection, the wiring becomes easy.

In the related art explained in FIG. 18~FIG. 21, when the failed signal line is occurred in x8 link construction 'A', x4 link construction 'B' is constructed when the lane group [#0~#3] are not failed, or x4 link construction 'C' is constructed when the lane group [#4~#7] are not failed. However, it is not possible to construct x4 link if both the lane group [#0~#3] and the lane group [#4~#7] are failed, thereby stopping of the data transfer.

The detail is explained in FIG. 26. For example, when detecting the failure of single signal line (lane #4: a path of the signal line 300-4, the driver 106-4 and the receiver 206-4 in FIG. 26), the control separate the failure signal line #4 and not-failed signal lines (the lane #5, #6 and #7) within the group [#4 ~#7] belonging to the failure signal line #4 from the data transfer. By the separation, the data transfer continues by using remaining four signal lines 300-0~300-3 to reduce the lane #0~#3. Further, when one lane #0 among four lanes #0~#3, that is utilized for data transfer, is failed, the lane #0~#3 which continue in the use of the data transfer cannot be selected and utilized.

While, in another related art explained in FIG. 22~FIG. 24, when one lane #0 among four lanes #0~#3, that is utilized for data transfer, is failed, a pair of lanes #6 and #7, that is non-failed signal lines in a separated group, are utilized and the failed lane #0 and its pair lane #1 are separated. Therefore, the data transfer can continue by x4 link construction.

However, since the data transfer continues by x4 link construction that a pair of lanes #6 and #7, that is non-failed signal lines in a separated group, are utilized, multiplexers of which a number of input is large are required in the sending device 100 and the reception device 200. The sizes of the sending device and the reception device are large, so the size of the LSI becomes large. And it is difficult to improve an operating frequency.

If further reducing the link width (for example, x2 link construction), the transfer speed becomes lower.

According to an aspect of the invention, a data transfer system for transferring data between devices connected via a plurality of signal lines, has a sending signal line selection unit that selects signal lines for data transferring among the plurality of signal lines and sends data via the selected signal lines, a reception signal line selection unit that receives the data via the selected signal lines, an abnormality detection unit that detects whether the selected signal lines are abnormal, and a signal line control unit that controls so that the sending signal line selection unit and the reception signal line selection unit select signal lines except an abnormal detected signal line according to an abnormal detection from the abnormal detection unit. And the signal line control unit includes a signal creation unit that creates a first selection signal indicating that any one or both signal line of a first pair of combination of reduction signal line and no-reduction signal line is or are not failed when the signal lines are reduced according to the abnormal detection from the abnormal detection unit, and a signal output unit that outputs a second selection signal indicating that any one or both signal line of a second pair of signal lines is or are not failed when a connection of the second selection signal indicating that any one or both signal line of a second pair of signal lines is changed in case of a lane reversal that connects a plurality of signal lines in a down order from a highest bit to a lowest bit of a sending device side with a plurality of signal in a up order from a highest bit to a lowest bit of a reception device side.

According to the other aspect of the invention, a reception device of a data transfer system that receives transferred data from a sending device via a plurality of signal lines, includes a reception signal line selection unit that receives the data via a plurality of signal lines selected among the plurality of signal lines as signal lines for data transferring, an abnormality detection unit that detects whether the selected signal lines are abnormal, and a signal line control unit that controls so that the reception signal line selection unit selects signal lines except an abnormal detected signal line according to an abnormal detection from the abnormal detection unit. And the signal line control unit includes a signal creation unit that creates a first selection signal indicating that any one or both signal line of a first pair of combination of reduction signal line and no-reduction signal line is or are not failed when the signal lines are reduced according to the abnormal detection from the abnormal detection unit, and a signal output unit that outputs a second selection signal indicating that any one or both signal line of a second pair of signal lines is or are not failed when a connection of the second selection signal indicating that any one or both signal line of a second pair of signal lines is changed in case of a lane reversal that connects a plurality of signal lines in a down order from a highest bit to a lowest bit of a sending device side with a plurality of signal in a up order from a highest bit to a lowest bit of a reception device side.

Further, according to the other aspect of the invention, a control method of a data transfer system for transferring data between devices connected via a plurality of signal lines, including: selecting signal lines for data transferring among the plurality of signal lines, sending data via the selected signal lines, receiving the data via the selected signal lines, detecting whether the selected signal lines are abnormal, and selecting signal lines except an abnormal detected signal line based on an abnormal detection. And the selecting includes creating a first selection signal indicating that any one or both signal line of a first pair of combination of reduction signal line and no-reduction signal line is or are not failed when the signal lines are reduced according to the abnormal detection from the abnormal detection unit, and outputting a second selection signal indicating that any one or both signal line of a second pair of signal lines is or are not failed when a connection of the second selection signal indicating that any one or both signal line of a second pair of signal lines is changed in case of a lane reversal that connects a plurality of signal lines in a down order from a highest bit to a lowest bit of a sending device side with a plurality of signal in a up order from a highest bit to a lowest bit of a reception device side.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanation diagram of a reduction pattern according to a first embodiment of the invention;

FIG. 5 is a flow diagram of a reduction according to a first embodiment of the invention;

FIG. 20 is an explanatory diagram of a reduction process in a related art;

FIG. 23 is an explanatory diagram of another reduction pattern in a related art;

FIG. 25 is an explanatory diagram of a lane reversal; and

FIG. 26 is an explanatory diagram of an operation at a lane reversal in a related art in FIG. 20.

DESCRIPTION OF EMBODIMENTS

The embodiments will be explained below in the following order; an information processing system, a first embodiment of a data transfer control device, a second embodiment of the data transfer control device, a third embodiment of the data transfer control device, and the other embodiments, but the disclosed information processing system and the data transfer control device are not limited to these embodiments.

(Information Processing System)

Figure 1:
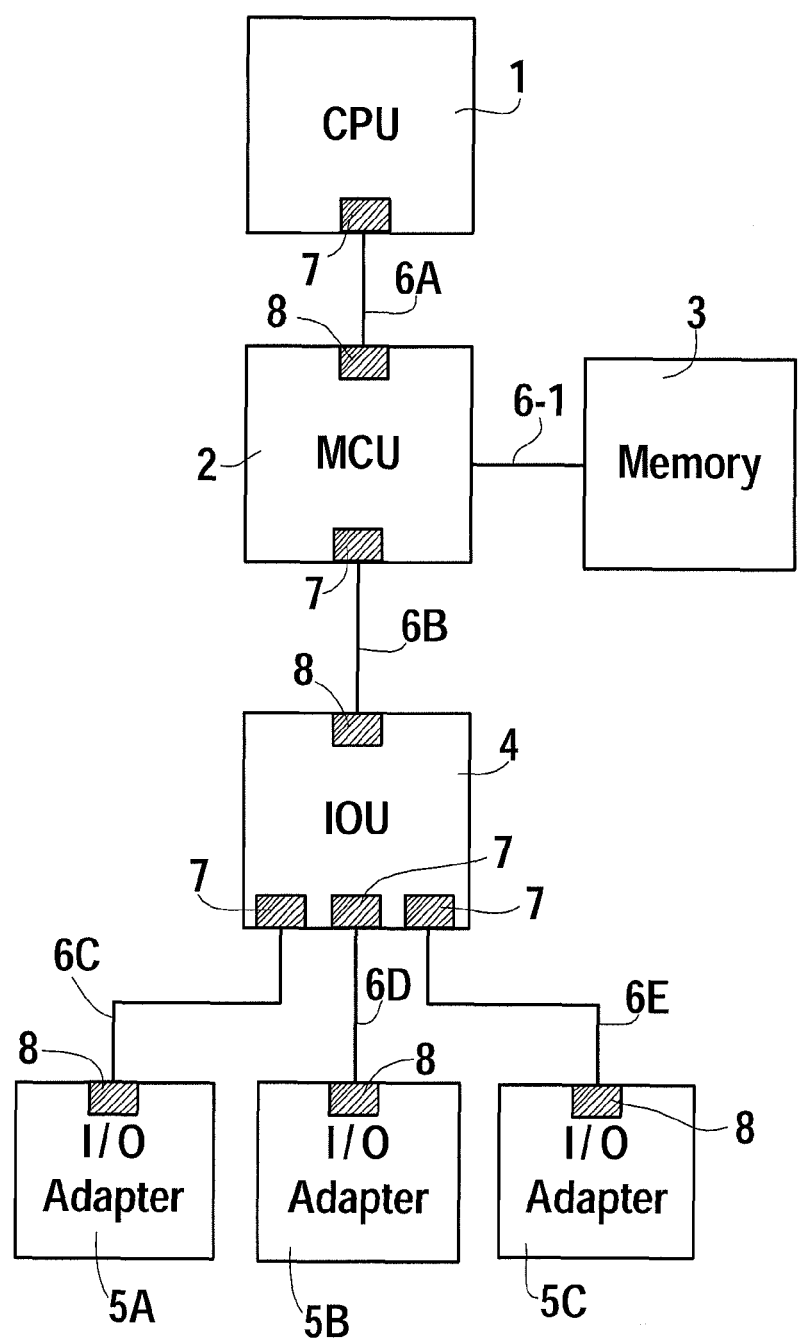
FIG. 1 is a configuration diagram of an information processing system according to an embodiment of the invention.
Figure 2:
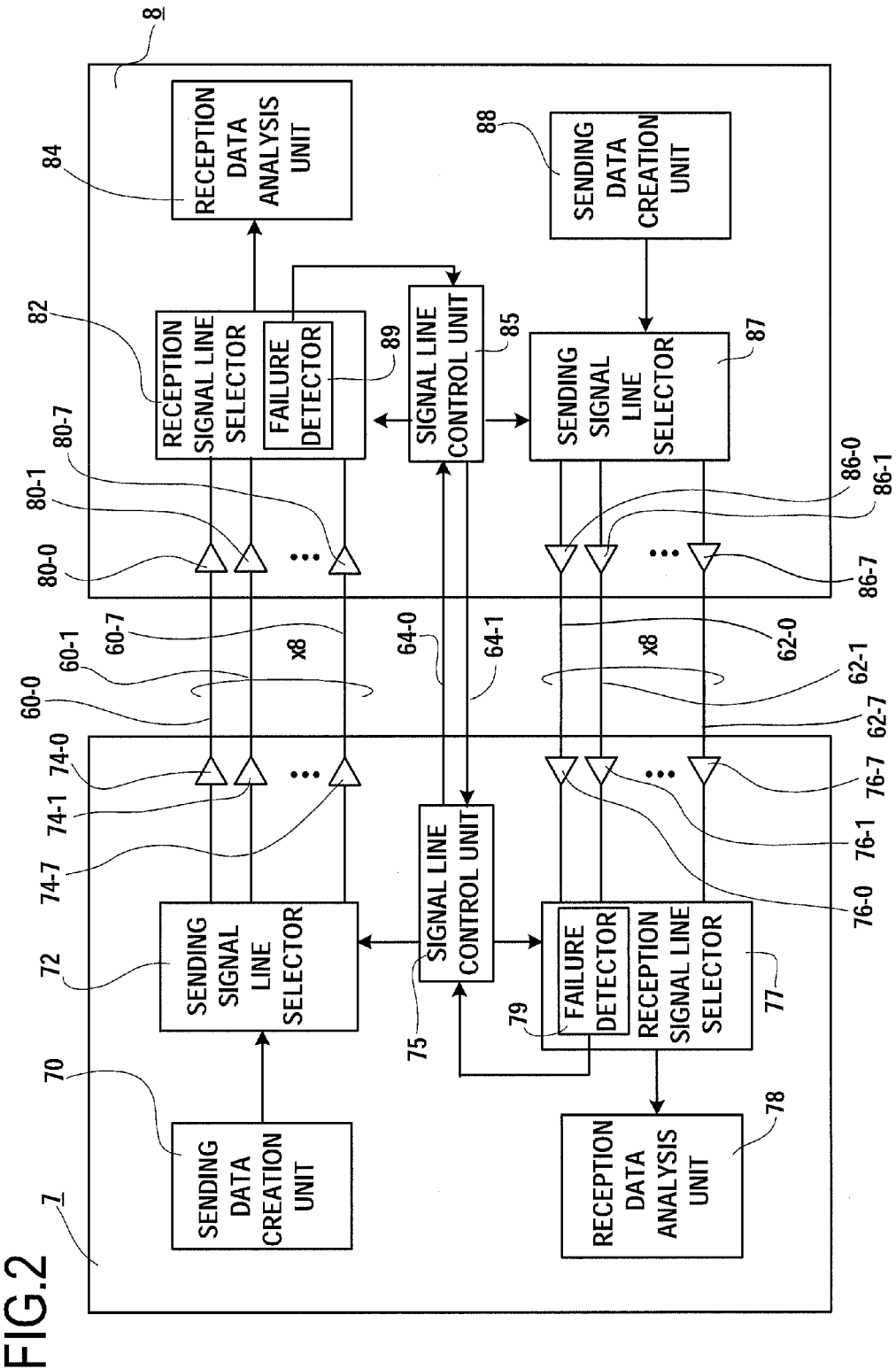
FIG. 2 is a block diagram of an data transfer control system in FIG. 1.

FIG. 1 illustrates a configuration diagram of an information processing system according to an embodiment. FIG. 2 illustrates a configuration diagram of a data transfer control device according an embodiment in FIG. 1. As illustrated in FIG. 1, an information processing system includes a CPU (Central Processing Unit) 1, a MCU (Memory control Unit) 2, a memory 3, an IOU (Input/Output Unit) 4 and I/O adapters (Input/Output adapters) 5A~5C. These elements are constructed by a LSI (Large Scale Integration Circuit).

The CPU 1 are connected to the MCU 2 via a signal line (serial bus) 6A, the MCU 2 is connected to the memory 3 via a signal line 6-1, the MCU 2 is connected to the IOU 4 via a signal line (serial bus) 6B, and the IOU 4 is connected to a plurality of the I/O adapter 5A~5C via signal lines 6C-6E respectively.

In this embodiment, the signal lines 6A~6E are targets. Data transfer control devices 7 and 8 are provided to both ends of the signal lines 6A~6E. In an operation of the information processing system, the CPU 1 reads and writes from and to the memory 3 via the MCU 2 and executes necessary data processing. The I/O adapters 5A~5C preferably include a network adapter and the IOU 4 preferably includes a bridge circuit. The CPU 1 executes transmission and reception to and from the I/O adapters 5A~5C via the MCU 2 and the IOU 4.

FIG. 2 illustrates a block diagram of signal lines 6A~6E and the data transfer control devices 7, 8 in FIG. 1. In this embodiment, an example is explained by a first device and a second device which are connected to each other via eight signal lines for data transfer (sending and reception) each other. However, a number of signal lines is not limited to eight.

In FIG. 2, in order to transfer data between the first and the second devices, eight signal lines for a single direction, that is, sixteen signal lines for bi-direction are connected to the devices. The first device 7 sends data to the second device 8 through eight signal lines 60-0~60-7. The second device 8 sends data to the first device 7 through eight signal lines 62-0~62-7.

Each sending side of the first and the second devices 7 and 8 has a sending data creation unit 70, 88 that prepares data to be sent and a sending line selection unit 72, 87 that distributes the sending data into each signal lines which is utilized by data transfer. A reception side of the first and the second devices 7 and 8 has a reception data analysis unit 78, 84 that analyzes the reception data and a reception line selection unit 82, 77 that collects and arranges the reception data from each signal lines which is utilized by data transfer.

Each of the reception line selection units 82, 77 has a failure detection unit 89, 79 that detects a failed signal line. And each of the first and the second devices 7 and 8 has a signal line control unit 75, 85 that controls switches of the sending line selection unit 72, 87 and the reception line selection unit 82, 77 which is utilized by data transfer, according to a failure detection of the signal lines from the failure detection unit 89, 79. The signal line control unit 75, 85 communicates the failure detection of the signal line via notification signal lines 64-0, 64-1 each other.

When any one of the failure detection unit 89, 79 in the reception line selection units 82, 77 detects the failure signal line, the signal line control unit 75, 85 instructs the signal line to utilize for data transfer to the sending line selection unit 72, 87 and the reception line selection unit 82, 77. By this operation, link construction between the first and the second devices 7, 8 is determined.

In the first device 7, the sending line selection unit 72 distributes serial sending data D0~D7, which is created by the sending data creation unit 70, to parallel signal lines 60-0~60-7 through drivers 74-0~74-7 according to the link construction. In the second device 8, the reception line selection unit 82 receives the data D0~D7 from the parallel signal lines 60-0~60-7 through receivers 80-0~80-7 according to the link construction, converts the reception data into serial data D0~D7 by arranging the reception data and outputs the serial data to the reception data analysis unit 84.

As same as, in the second device 8, the sending line selection unit 87 distributes serial sending data D0~D7, which is created by the sending data creation unit 88, to parallel signal lines 62-0~62-7 through drivers 86-0~86-7 according to the link construction. In the first device 7, the reception line selection unit 77 receives the data D0~D7 from the parallel signal lines 62-0~62-7 through receivers 76-0~76-7 according to the link construction, converts the reception data into serial data D0~D7 by arranging the reception data and outputs the serial data to the reception data analysis unit 78.

(A First Embodiment of the Data Transfer Control Device)

Figure 3:
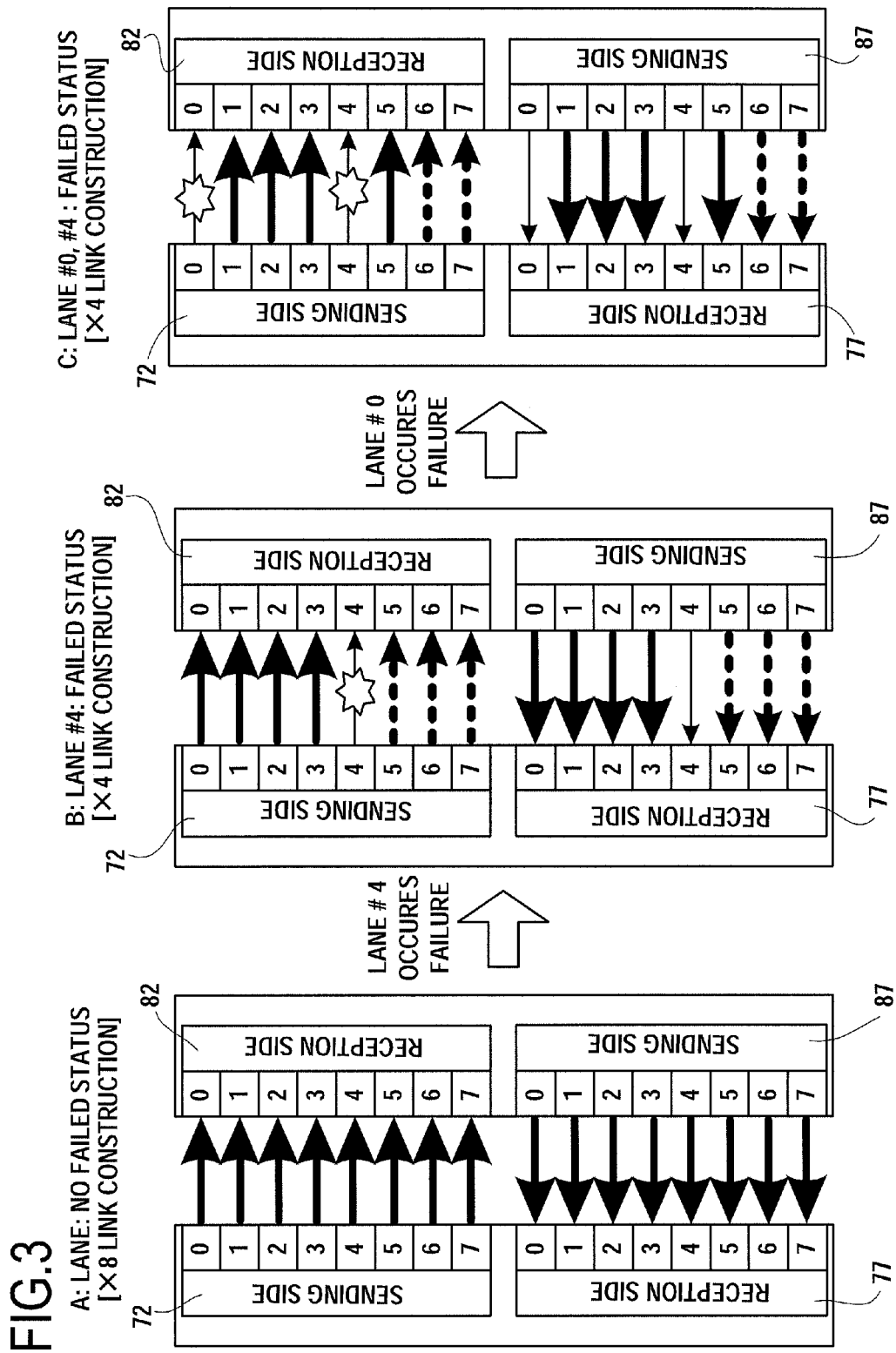
FIG. 3 is an explanatory diagram of a reduction process according to a first embodiment of the invention.
Figure 5:
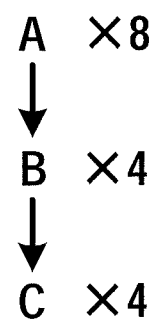

FIG. 3 illustrates a diagram of explanation of reduction operation according to a first embodiment of the data transfer control device. FIG. 4 illustrates a relation diagram between the link construction and the reduction operation. FIG. 5 illustrates a flow diagram of the reduction operation.

FIG. 3 illustrates an example of the bi-directional data transfer according to the construction in FIG. 2. That is, the sending line selection unit 72 in the first device 7 sends data to the reception line selection unit 82 of the second device 8 through lanes #0~#7, and the reception line selection unit 77 of the first device 7 receives the data from the sending line selection unit 87 in the second device 8 through the lanes #0~#7. And the lane #0~#7 includes the driver, the signal line and the receiver as illustrated in FIG. 2.

In this embodiment, a number of combinations of four lanes are increased at the reduction, as below. As illustrated in FIG. 4 and FIG. 5, in the x8 (eight) link width construction 'A' that utilizes lanes #0~#7, a not-failed lane is selected from any one of the lane group [#0, #4], the lane group [#1, #5], the lane group [#2, #6] and the lane group [#3, #7], that each combines two lanes, if one lane is failed, and is selected from each of the groups of the lane group [#0, #4], the lane group [#1, #5], the lane group [#2, #6] and the lane group [#3, #7] if any one of the lanes or both of the lanes are failed, thereby reducing x4 (four) link width construction 'B' that utilizes four lanes.

And, in the x4 (four) link width construction 'B', a not-failed lane is selected from each of the lane group [#0, #7], the lane group [#1, #6], the lane group [#2, #5] and the lane group [#3, #4], further if one lane of the selected lane is failed and the four link width construction 'B' cannot be constructed, thereby reducing the x4 (four) link width construction 'C'. In this case, it is required that any one or both of each of the lane group [#0, #7], the lane group [#1, #6], the lane group [#2, #5] and the lane group [#3, #4] is or are not failed.

For example, as illustrated in FIG. 3, in the x8 (eight) link width construction 'A', when the lane 4 is failed, because any one or both of each group in all of the lane group [#0, #4], the lane group [#1, #5], the lane group [#2, #6] and the lane group [#3, #7] is or are not failed, that is, the lane #0 of the lane group [#0, #4] and both lane of the other lane group are not failed, four lane including the lanes #0, #1, #2, #4 are selected, thereby reducing the x4 (four) link width construction 'B'.

Next, in the x4 (four) link width construction 'B', when the lane 0 is further failed, because any one or both of each lane group in all of the lane group [#0, #7], the lane group [#1, #6], the lane group [#2, #5] and the lane group [#3, #4] is or are not failed, that is, the lane #7 of the lane group [#0, #7], the lane #3 of the lane group [#3, #4] and both lane of the other lane group are not failed, the lane 7 is selected as replacement for the lane #0, thereby reducing the x4 (four) link width construction 'C' that are utilized the lane #1, the lane #2, the lane #3 and the lane #7.

In this reduction, a no-failed lane that is utilized in a previous reduction is remained and the replace lane is selected from no-failed lane that is not utilized as a replacement lane of the failed lane.

In this way, a reduction management is performed for an unit of a pair of lanes. And as a combination of the pair of lanes, a first group including a first lane for target that reduce and a second lane for target that does not reduce and a second group including a third lane for target that reduce and a fourth lane that changes at lane reversal are provided. Further, the no-failed lane is selected from the group that any one lane is or both lanes are not failed (that is, both lanes are not failed).

That is, it is possible to suppress the reduction width into a half by selecting the signal line that is not utilized at reduction, even though two signal lines are occurred failure among eight signal lines and lane reversal is executed. Further it is possible to become that a size of a multiplexer for reduction is small, thereby reducing a circuit size, as explained below.

Figure 6:
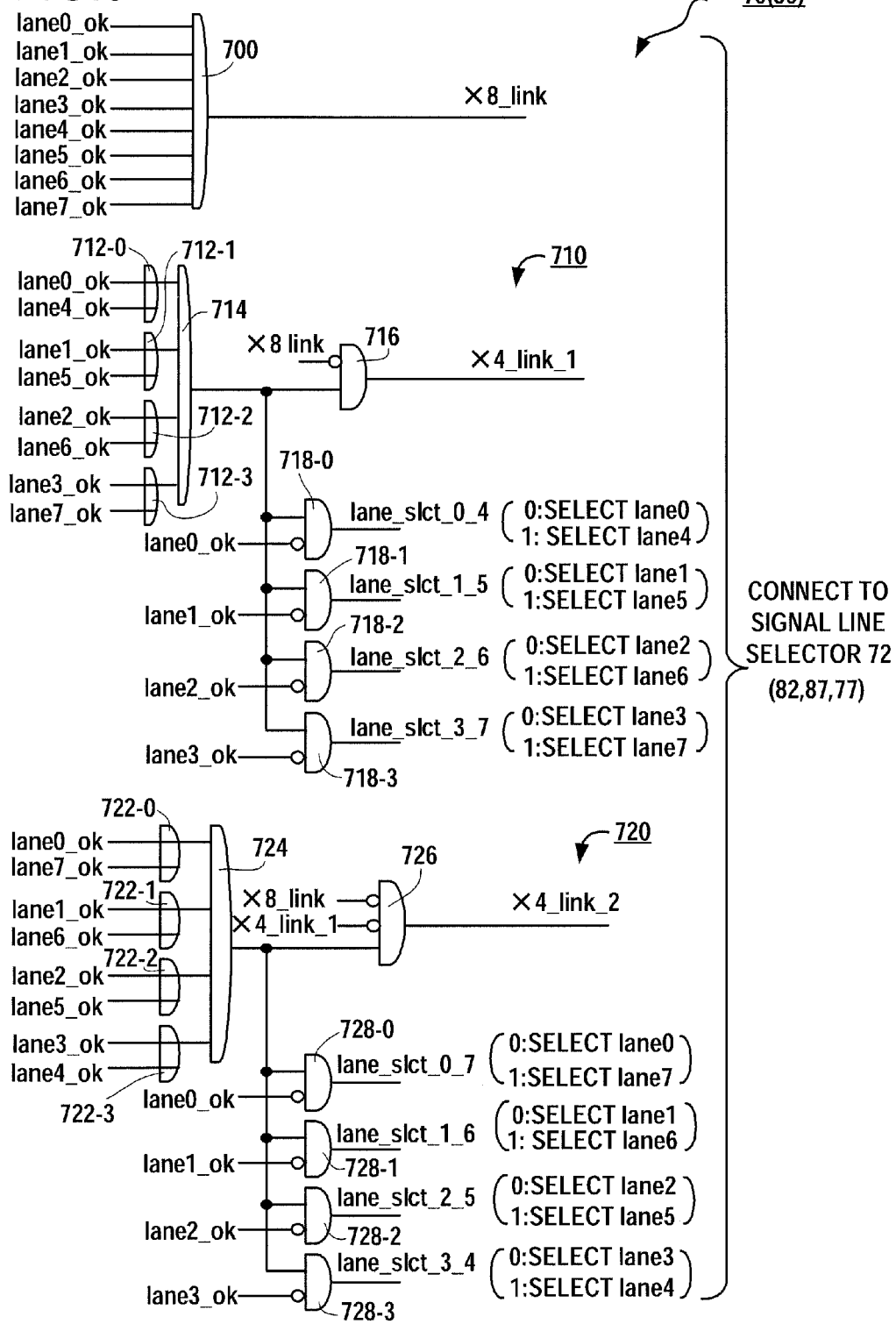
FIG. 6 is a circuit diagram of a first embodiment of the invention of a signal line control unit in FIG. 2.
Figure 7:
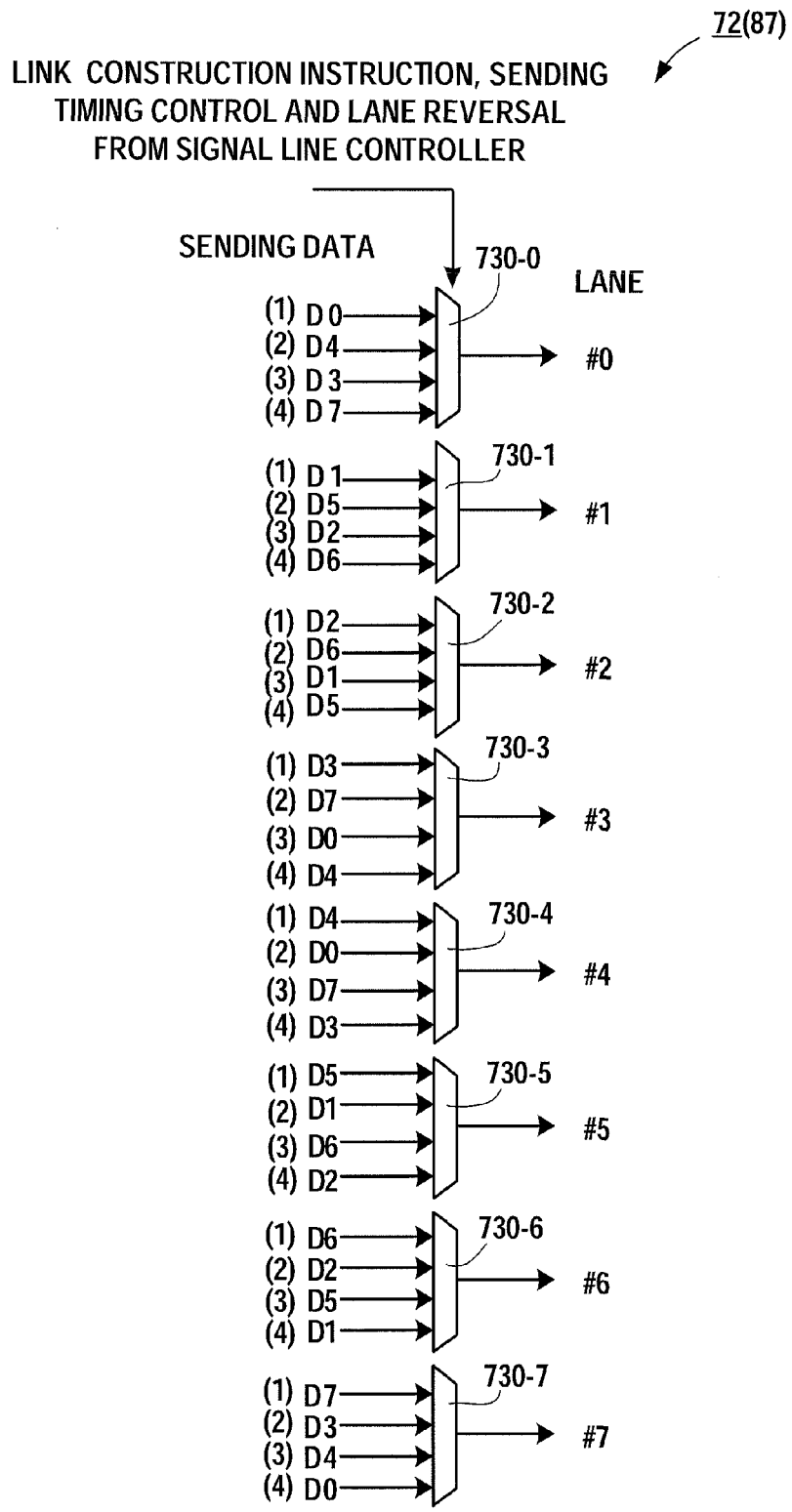
FIG. 7 is a circuit diagram of a first embodiment of a sending signal line selection unit in FIG. 2.
Figure 8:
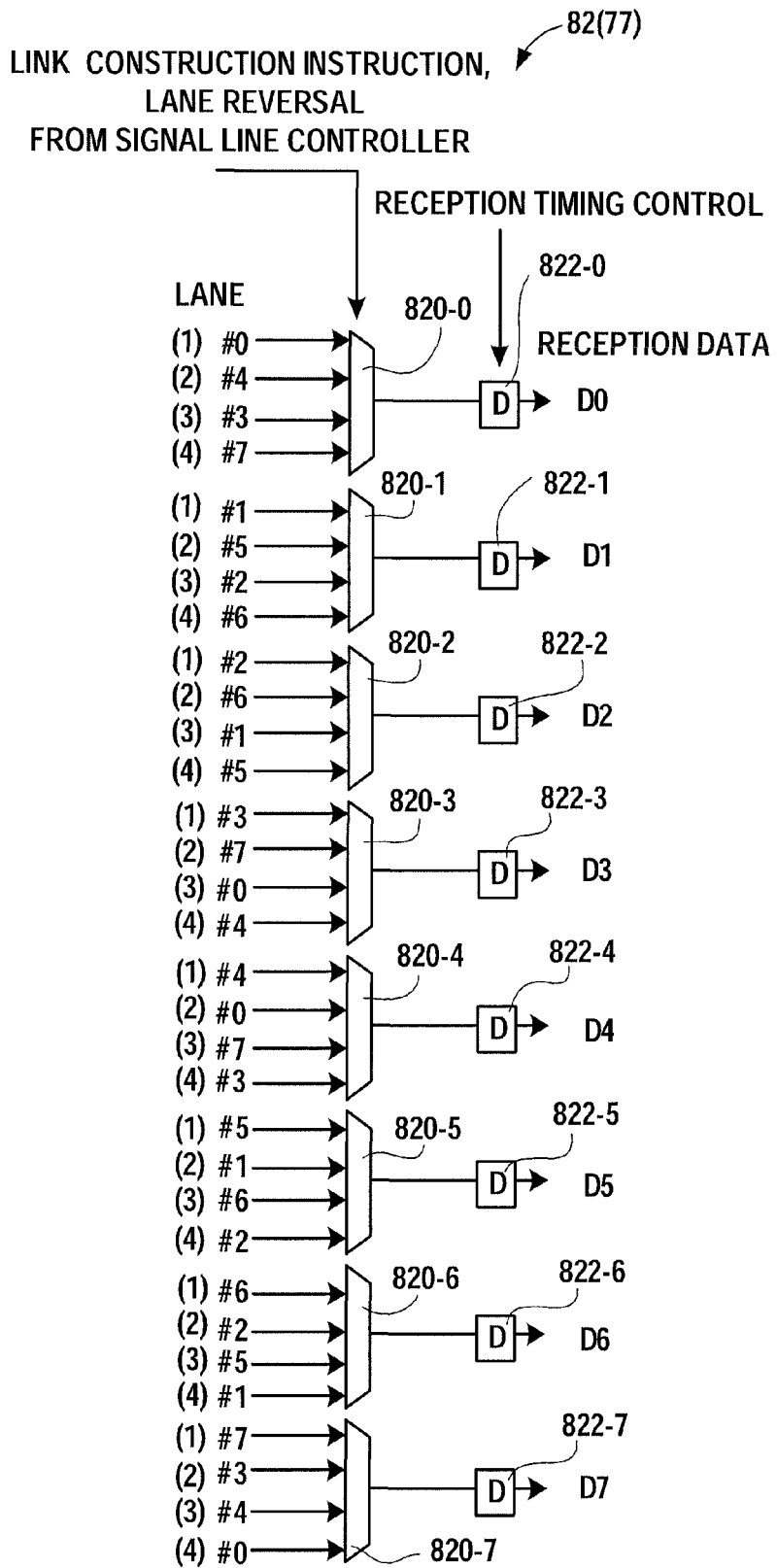
FIG. 8 is a circuit diagram of a first embodiment of a reception signal line selection unit in FIG. 2.

FIG. 6 illustrates a circuit diagram of the signal line control unit 75 (85) according to a first embodiment in FIG. 2. FIG. 7 illustrates a circuit diagram of the sending signal line selection unit 72 (87) in FIG. 2. FIG. 8 illustrates a circuit diagram of the reception signal line selection unit 82 (77) in FIG. 2.

In FIG. 6, the signal line control unit 75 (85) has a first circuit 700 that instructs the x8 (eight) link construction when judging that all signal lines are not failed, a second circuit 710 that instructs the x4 (four) link construction when judging that any one lane is or both lanes are not failed in each of the lane group [#0, #4], the lane group [#1, #5], the lane group [#2, #6] and the lane group [#3, #7], and a third circuit 720 that instructs the x4 (four) link construction when judging that any one lane is or both lanes are not failed in each of the lane group [#0, #7], the lane group [#1, #6], the lane group [#2, #5] and the lane group [#3, #4].

The failure detection circuit 79 (89) becomes the lane0 ok~lane7 ok signals to high level ("1") when not detecting the failure of each lanes #0l8 #7, and becomes the lane ok signal of the lane that is detected the failure to low level ("0") when detecting the failure of the lanes #0~#7.

The first circuit 700 has AND circuits that arithmetic calculates a logical product of the lane0 ok signal to the lane7 ok signal. The second circuit 710 has a first OR circuit 712-0 that arithmetic calculates a logical sum of the lane0 ok signal and the lane4 ok signal of the lane group [#0, #4], a second OR circuit 712-1 that arithmetic calculates a logical sum of the lane1 ok signal and the lane5 ok signal of the lane group [#1, #5], a third OR circuit 712-2 that arithmetic calculates a logical sum of the lane2 ok signal and the lane6 ok signal of the lane group [#2, #6], a fourth OR circuit 712-3 that arithmetic calculates a logical sum of the lane3 ok signal and the lane7 ok signal of the lane group [#3, #7] and a AND circuit 714 that arithmetic calculates a logical product of the outputs from four OR circuits 712-0~712-3.

The second circuit 710 has a AND circuit 716 that arithmetic calculates a logical product of the output from the AND circuit 714 and a reverse signal of the x8 (eight) link signal that instructs the x8 (eight) link construction from the first circuit 700 and outputs x4 link1 signal that instructs x4 link construction, and four AND circuits 718-0~718-3 that each arithmetic calculates a logical product of the output of the AND circuit 714 and a reverse signal of the lane0 ok signal of the lane#0, a reverse signal of the lane1 ok signal of the lane#1, a reverse signal of the lane2 ok signal of the lane#2 and a reverse signal of the lane3 ok signal of the lane#3.

Accordingly, the second circuit 710 outputs x4 link construction instruction from the AND circuit 716 and the lane select signals (lane_slct 0_4, 1_5, 2_6 and 3_7) in x4 link construction from the four AND circuit 718-0~718-3 when one lane is failed. That is, when all the outputs of the four AND circuits 718-0~718-3 are '0', a selection of the lanes #0, #1, #2 and #3 is instructed. And when all the outputs of the four AND circuits 718-0~718-3 are '1', a selection of the lanes #4, #5, #6 and #7 is instructed.

The third circuit 720 has, as same as the second circuit 710, a first OR circuit 722-0 that arithmetic calculates a logical sum of the lane0 ok signal and the lane7 ok signal of the lane group [#0, #7], a second OR circuit 722-1 that arithmetic calculates a logical sum of the lane1 ok signal and the lane6 ok signal of the lane group [#1, #6], a third OR circuit 722-2 that arithmetic calculates a logical sum of the lane2 ok signal and the lane5 ok signal of the lane group [#2, #5], a fourth OR circuit 722-3 that arithmetic calculates a logical sum of the lane3 ok signal and the lane4 ok signal of the lane group [#3, #4] and a AND circuit 724 that arithmetic calculates a logical product of the outputs from four OR circuits 722-0~722-3.

The third circuit 720 has a AND circuit 726 that arithmetic calculates a logical product of the output from the AND circuit 724, a reverse signal of the x8 (eight) link signal that instructs the x8 (eight) link construction from the first circuit 700 and a reverse signal of the x4 link 1 signal that instructs x4 link construction, and outputs x4 link2 signal that instructs x4 link construction, and four AND circuits 728-0~728-3 that each arithmetic calculates a logical product of the output of the AND circuit 724 and a reverse signal of the lane0 ok signal of the lane#0, a reverse signal of the lane1 ok signal of the lane#1, a reverse signal of the lane2 ok signal of the lane#2 and a reverse signal of the lane3 ok signal of the lane#3.

Accordingly, the third circuit 720 outputs x4 link construction instruction from the AND circuit 726 and the lane select signals (lane_slct 0_7, 1_6, 2_5 and 3_4) in x4 link construction from the four AND circuits 728-0~728-3 when x4 link 1 construction cannot be constructed and the x4link 2 construction can be constructed. That is, when all the outputs of the four AND circuits 728-0~728-3 are '0', the third circuit 720 instructs a selection of the lanes #0, #1, #2 and #3. And when all the outputs of the four AND circuits 728-0~728-3 are '1', the third circuit 720 instructs a selection of the lanes #7, #6, #5 and #4.

By this construction, x8 Link construction is instructed when all signal lines (lanes) are not failed, because of the signal "x8_link"=1, signal "x4_link_1"=0 and the signal "x4_link_2"=0. And when any signal line is failed, x4 Link construction is instructed when any one or both signal lines of each lane group [#0, #4], [#1, #5], [#2, #6] and [#3, #7] is or are not failed, because of the signal "x8_link"=0, signal "x4_link_1"=1 and the signal "x4_link_2"=0.

Further, when the x4 link construction cannot be constructed by occurring a failure of the signal line in above x4 link construction, x4 Link construction is instructed when any one or both signal lines of each lane group [#0, #7], [#1, #6], [#2, #5] and [#3, #4] is or are not failed, because of the signal "x8_link"=0, signal "x4_link_1"=0 and the signal "x4_link_2"=1. Here, in this embodiment, young number lane is selected when both lanes of the group are not failed.

Next, the sending signal line selection circuit 72 (87) in FIG. 7 is explained. The sending signal line selection circuit 72 (87) has eight (eight lanes) multiplexers 730-0~730-7 that select one among four inputs (sending data). Four inputs of each multiplexers 730-0~730-3 are defined from top of the Figure, as below.

(1) first data that is utilized at the time of x8 link, x4 link 1 and 2, and x4 link2 of the lane reversal applied.

(2) second data that is utilized at the time of x4 link 1 and 2, and x4 link2 of the lane reversal applied.

(3) third data that is utilized at the time of x4 link1 of the lane reversal applied.

(4) fourth data that is utilized at the time of x8 link and x4 link1 of the lane reversal applied.

And four inputs of each multiplexers 730-4~730-7 are defined from top of the Figure, as below.

(1) first data that is utilized at the time of x8 link, x4 link 1.

(2) second data that is utilized at the time of x4 link 1.

(3) third data that is utilized at the time of x4 link 2 and x4 link1 and 2 of the lane reversal applied.

(4) fourth data that is utilized at the time of x4 link 2 and x8 link, x4 link1 and x4 link2 of the lane reversal applied.

For example, in the first multiplexer 730-0, the input (1) is data D0, the input (2) is data D4, the input (3) is data D3 and the input (4) is data D7. As control signals, the link construction instruction, the lane select signals (x8 link, x4 link1 and the lane_slct 0_4, 1_5, 2_6 and 3_7 and x4 link2 and the lane_slct 0_7, 1_6, 2_5 and 3_4), sending timing signal at x4 link and the lane reversal instruction signal from the signal line control unit are input to all multiplexers 730-0~730-7.

According to these control signals, eight multiplexers 730-0~730-7 select the input (1) and simultaneously outputs it to the eight lanes 0~7 when x8 link construction instruction is '1' and the lane reversal instruction signal that instructs the lane reversal is '0' (not applied). And the eight multiplexers 730-0~730-7 select the input (4) and simultaneously outputs it to the eight lanes 0~7 when x8 link construction instruction is '1' and the lane reversal instruction signal that instructs the lane reversal is '1' (applied).

In the eight multiplexers 730-0~730-7, four multiplexers are selected by the lane select signal lane_slct 0_4, 1_5, 2_6, 3_7 when x4 link1 construction instruction is '1'.

The selected four multiplexers select the inputs (1) and (2) and sequentially outputs it to the lane according to the sending timing signal when the lane reversal instruction signal that instructs the lane reversal is '0' (not applied). And the selected four multiplexers select the inputs (3) and (4) and sequentially output it to the lane according to the sending timing signal when the lane reversal instruction signal that instructs the lane reversal is '1' (applied).

In the eight multiplexers 730-0~730-7, four multiplexers are selected by the lane select signal lane_slct 0_7, 1_6, 2_5, 3_4 when x4 link2 construction instruction is '1'.

The selected four multiplexers, for example the multiplexers 730-0~730-3 select the inputs (1) and (2) and sequentially outputs it to the lane according to the sending timing signal when the lane reversal instruction signal that instructs the lane reversal is '0' (not applied). And in the selected four multiplexers, the multiplexers 730-0~730-3 select the inputs (1) and (2) and the multiplexers 730-4~730-7 select the inputs (3) and (4) and sequentially output it to the lane according to the sending timing signal when the lane reversal instruction signal that instructs the lane reversal is '1' (applied).

Next, the reception signal line selection circuit 82 (77) in FIG. 8 is explained. The reception signal line selection circuit 82 (77) has eight (eight lanes) multiplexers 820-0~820-7 that select one among four inputs (reception data from four lanes) and delay circuits (buffers) 822-0~822-7. Four inputs of each multiplexers 820-0~820-3 are defined from top of the Figure, as below.

(1) first signal line (lane) that is utilized at the time of x8 link, x4 link 1 and 2, and x4 link2 of the lane reversal applied.

(2) second signal line (lane) that is utilized at the time of x4 link 1.

(3) third signal line (lane) that is utilized at the time of x4 link1 of the lane reversal applied.

(4) fourth signal line (lane) that is utilized at the time of x4 link2 and x8 link and x4 link1 and x4 link2 of the lane reversal applied.

And four inputs of each multiplexers 820-4-820-7 are defined from top of the Figure, as below.

(1) first signal line (lane) that is utilized at the time of x8 link and x4 link 1.

(2) second signal line (lane) that is utilized at the time of x4 link 1 and x4 link2 and x4 link 2 of the lane reversal applied.

(3) third signal line (lane) that is utilized at the time of x4 link 2 and x4 link1 and 2 of the lane reversal applied.

(4) fourth signal line (lane) that is utilized at the time of x8 link, x4 link1 of the lane reversal applied.

For example, in the first multiplexer 820-0, the input (1) is the lane#0, the input (2) is the lane#4, the input (3) is the lane#3 and the input (4) is the lane #7. As control signals, the link construction instruction, the lane select signals (x8 link, x4 link1 and the lane_slct 0_4, 1_5, 2_6 and 3_7 and x4 link2 and the lane_slct 0_7, 1_6, 2_5 and 3_4), and the lane reversal instruction signal from the signal line control unit are input to all multiplexers 820-0~820-7.

According to these control signals, eight multiplexers 820-0~820-7 select the input (1) and outputs it to the delay circuits 822-0~822-7 respectively when x8 link construction instruction is '1' and the lane reversal instruction signal that instructs the lane reversal is '0' (not applied). And the eight multiplexers 820-0~820-7 select the input (4) and outputs it to the delay circuit 822-0~822-7 respectively when x8 link construction instruction is '1' and the lane reversal instruction signal that instructs the lane reversal is '1' (applied).

In the eight multiplexers 820-0~820-7, four multiplexers are selected by the lane select signal lane_slct 0_4, 1_5, 2_6, 3_7 when x4 link1 construction instruction is '1'.

The selected four multiplexers select the inputs (1) or (2) and output it when the lane reversal instruction signal that instructs the lane reversal is '0' (not applied). And the selected four multiplexers select the inputs (3) or (4) and output it when the lane reversal instruction signal that instructs the lane reversal is '1' (applied).

In the eight multiplexers 820-0~820-7, four multiplexers are selected by the lane select signal lane_slct 0_7, 1_6, 2_5, 3_4 when x4 link2 construction instruction is '1'.

The selected four multiplexers, for example the multiplexers 820-0~820-3 select the inputs (1) or (4) and outputs it when the lane reversal instruction signal that instructs the lane reversal is '0' (not applied). And in the selected four multiplexers, the multiplexers 820-0~820-3 select the inputs (1) or (4) and the multiplexers 730-4-730-7 select the inputs (2) or (3) and output it when the lane reversal instruction signal that instructs the lane reversal is '1' (applied).

The delay circuits 822-0~822-7 latch the outputs of each multiplexers 820-0~820-7 by the reception timing signal.

Figure 9:
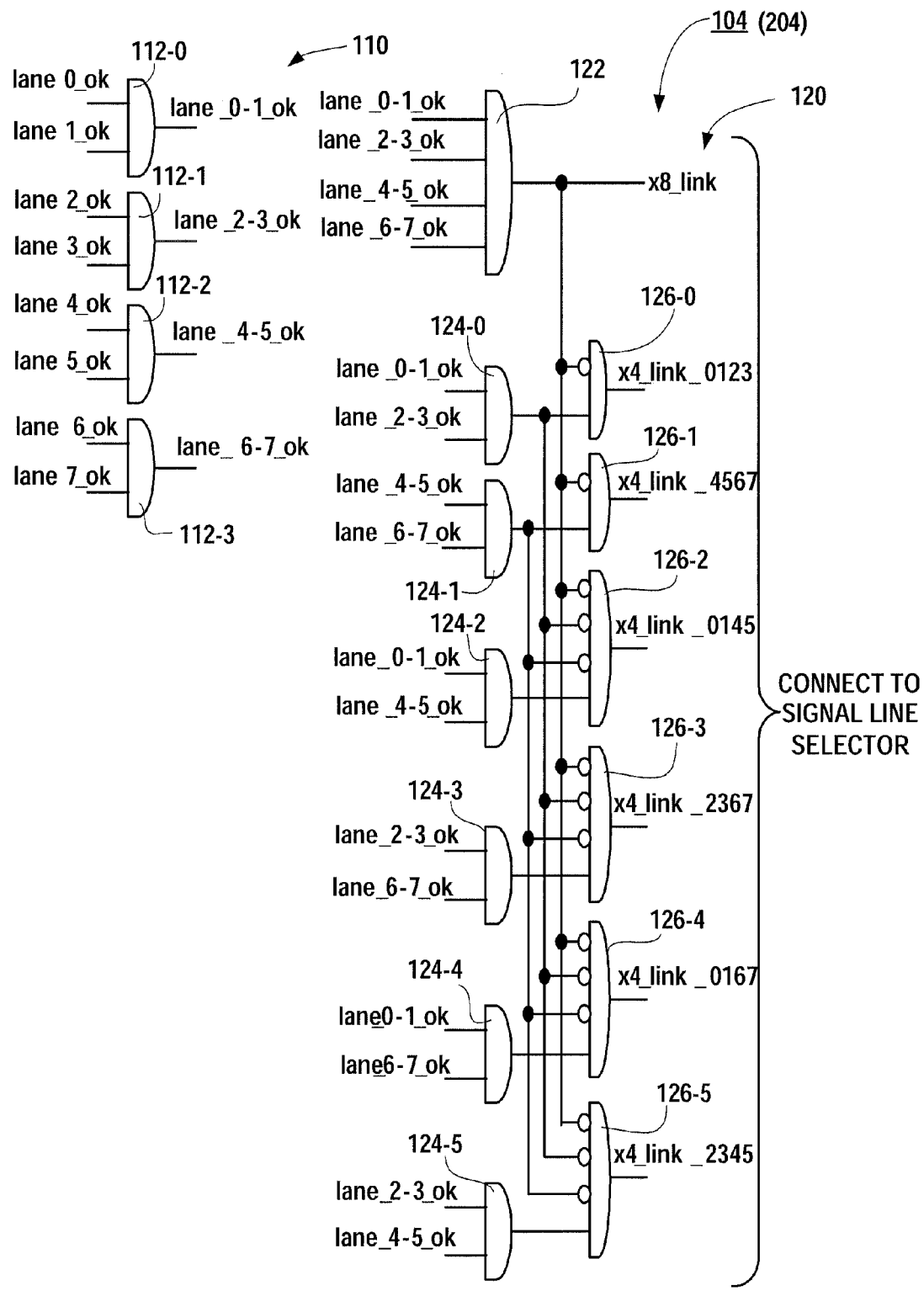
FIG. 9 is a circuit diagram of a comparative example of a signal line control unit.

As a comparative example, the construction of the signal line control unit 104, the sending signal line selection unit 102 and the reception signal line selection unit 202 of another related art explained in FIG. 22, FIG. 23 and FIG. 24 will be explained by using FIG. 9, FIG. 10 and FIG. 11. In FIG. 9, the failure detection unit 208 maintains the lane0 ok signal~lane7 ok signal to high level ("1") when the failure detection unit 208 does not detect failures of each lane #0~#7, and changes the lane ok signal of the lane which is detected the failure to low level ("0") when detecting the failure of the lane.

In FIG. 9, the signal line control unit 104 has a pair no-failure detection circuit 110 that outputs a signal indicating no-failure of both pair signal lines of each of the lane groups [#0, #1], [#2, #3], [#4, #5] and [#6, #7] and four AND circuits 112-0~112-3 that each arithmetic calculates a logical product of the lane0 ok signal~lane7 ok signal of the lane groups [#0, #1], [#2, #3], [#4, #5] and [#6, #7].

An eight link/four link selection circuit 120 has a first AND circuit 122 that arithmetic calculates a logical product of the outputs of four AND circuits 112-0~112-3 and outputs x8 link signal that instructs x8 link construction. And the eight link/four link selection circuit 120 has six AND circuits 124-0~124-5 that each arithmetic calculates a logical product of two outputs of four AND circuits 112-0~112-3 and outputs six combination signal for x4 link selection, a second AND circuit 126-0 that arithmetic calculates a logical product of a reverse signal of the output from the first AND circuit 122 and the output signal of the AND circuit 124-0, and a third AND circuit 126-1 that arithmetic calculates a logical product of a reverse signal of the output from the first AND circuit 122 and the output signal of the AND circuit 124-1.

Further, the eight link/four link selection circuit 120 has a first four input type AND circuit 126-2 that arithmetic calculates a logical product of a reverse signal of the output from the first AND circuit 122, reverse signals of the outputs from the second and third AND circuits 124-0, 124-1 and the output signal of the AND circuit 124-2, a second four input type AND circuit 126-3 that arithmetic calculates a logical product of a reverse signal of the output from the first AND circuit 122, reverse signals of the outputs from the second and third AND circuits 124-0, 124-1 and the output signal of the AND circuit 124-3, a third four input type AND circuit 126-4 that arithmetic calculates a logical product of a reverse signal of the output from the first AND circuit 122, reverse signals of the outputs from the second and third AND circuits 124-0, 124-1 and the output signal of the AND circuit 124-4, and a fourth four input type AND circuit 126-5 that arithmetic calculates a logical product of a reverse signal of the output from the first AND circuit 122, reverse signals of the outputs from the second and third AND circuits 124-0, 124-1 and the output signal of the AND circuit 124-5.

By this construction, as explained in FIG. 23, six way four link width construction instructions B~G are output. That is, x8 link construction is instructed when all signal lines are not failed, because "x8_link" signal is "1", "x4_link_0123" signal is "0", "x4_link_4567" signal is "0", "x4_link_0145" signal is "0", "x4_link_2367" signal is "0", "x4_link_0167" signal is "0", "x4_link_2345" signal is "0".

When the signal line is occurred a failure, x4 link construction of the lane group [#0~#3] is instructed when the lane group [#0~#3] are not failed, because "x8_link" signal is "0", "x4_link_0123" signal is "1", "x4_link_4567" signal is "0", "x4_link_0145" signal is "0", "x4_link_2367" signal is "0", "x4_link_0167" signal is "0", "x4_link_2345" signal is "0". While, x4 link construction of the lane [#4~#7] is instructed when the lane group [#4~#7] are not failed, because "x8_link" signal is "0", "x4_link_0123" signal is "0", "x4_link_4567" signal is "1", "x4_link_0145" signal is "0", "x4_link_2367" signal is "0", "x4_link_0167" signal is "0", "x4_link_2345" signal is "0".

When further failure occurs and above link construction cannot be realized, x4 link construction of the lane group [#0, #1, #4, #5] is instructed when the lane group [#0, #1, #4, #5] are not failed, because "x8_link" signal is "0", "x4_link_0123" signal is "0", "x4_link_4567" signal is "0", "x4_link_0145" signal is "1", "x4_link_2367" signal is "0", "x4_link_0167" signal is "0", "x4_link_2345" signal is "0".

While, when the lane group [#2, #3, #6, #7] are not failed, x4 link construction of the lane group [#2, #3, #6, #7] is instructed, because "x8_link" signal is "0", "x4_link_0123" signal is "0", "x4_link_4567" signal is "0", "x4_link_0145" signal is "0", "x4_link_2367" signal is "1", "x4_link_0167" signal is "0", "x4_link_2345" signal is "0".

And when the lane group [#0, #1, #6, #7] are not failed, x4 link construction of the lane group [#0, #1, #6, #7] is instructed, because "x8_link" signal is "0", "x4_link_0123" signal is "0", "x4_link_4567" signal is "0", "x4_link_0145" signal is "0", "x4_link_2367" signal is "0", "x4_link_0167" signal is "1", "x4_link_2345" signal is "0".

Further, when the lane group [#2, #3, #4, #5] are not failed, x4 link construction of the lane group [#2, #3, #4, #5] is instructed, because "x8_link" signal is "0", "x4_link_0123" signal is "0", "x4_link_4567" signal is "0", "x4_link_0145" signal is "0", "x4_link_2367" signal is "0", "x4_link_0167" signal is "0", "x4_link_2345" signal is "1".

Figure 10:
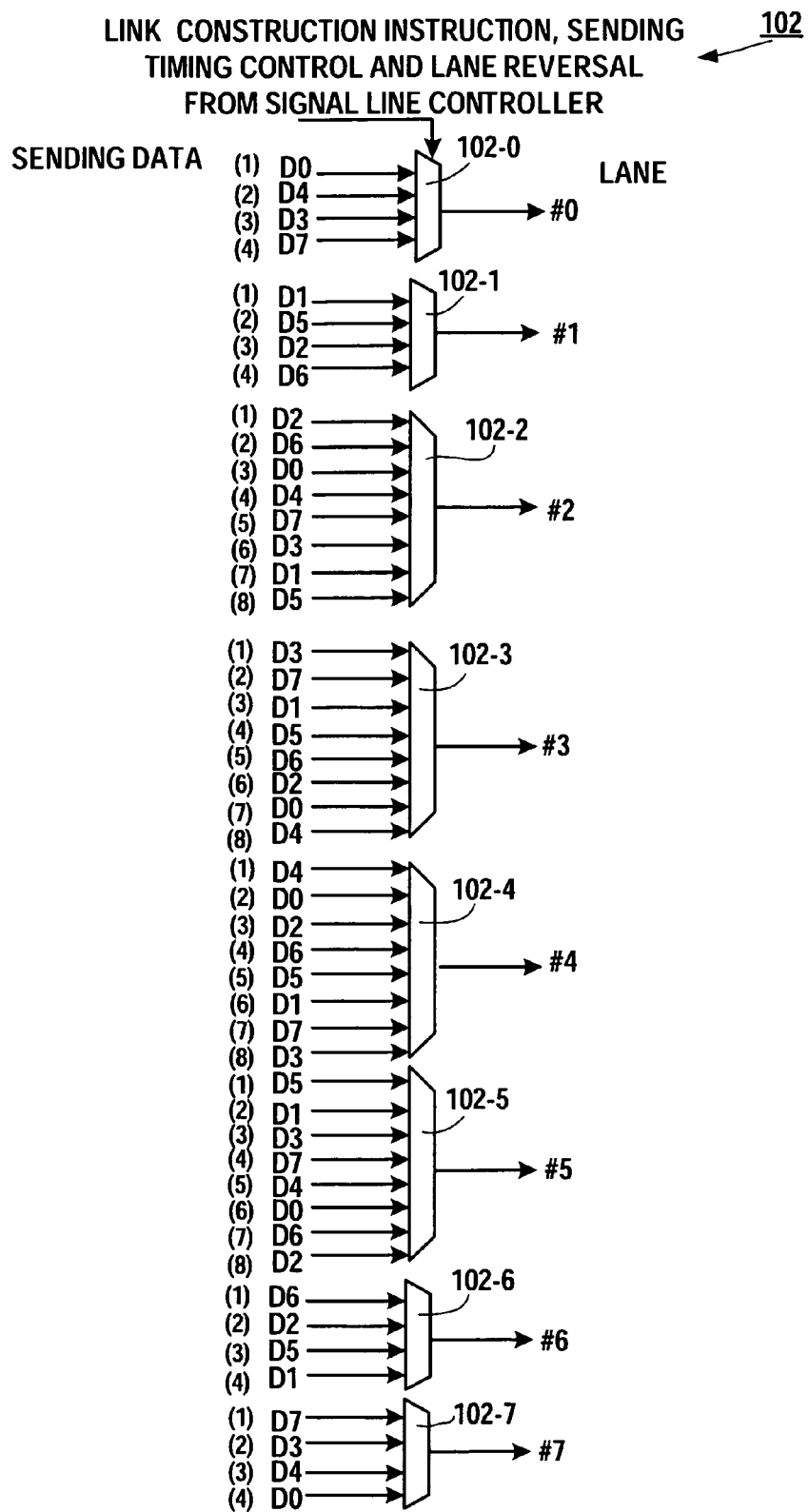
FIG. 10 is a circuit diagram of a comparative example of a sending signal line selection unit.
Figure 11:
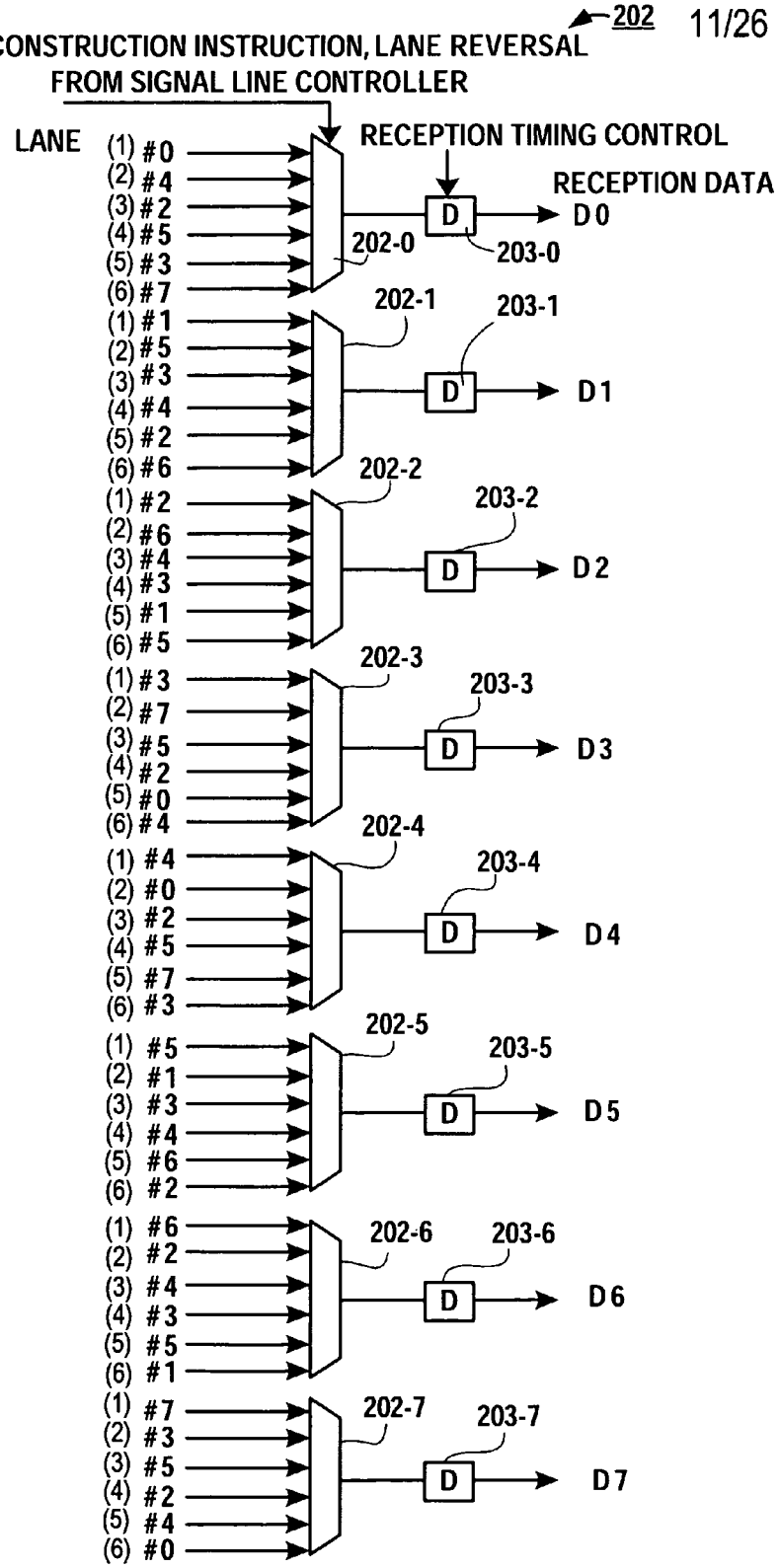
FIG. 11 is a circuit diagram of a comparative example of a reception signal line selection unit.

Next, the signal line selection circuit for realize above link construction is explained by using FIG. 10 and FIG. 11. In FIG. 10, the signal line selection 102 has four first multiplexers having four inputs and four second multiplexers having eight inputs. Four inputs of each first multiplexers 102-0, 102-1, 102-6 and 102-7 are defined from top of the Figure, as below.

(1) first signal line (lane) that is utilized at the time of x8 link and x4 link.
(2) second signal line (lane) that is utilized at the time of x4 link.
(3) third signal line (lane) that is utilized at the time of x4 link of the lane reversal applied.
(4) fourth signal line (lane) that is utilized at the time of x8 link and x4 link of the lane reversal applied.

And eight inputs of each multiplexers 102-2~102-5 are defined from top of the Figure, as below.

(1) first signal line (lane) that is utilized at the time of x8 link and x4 link.
(2)~(4) second signal lines (lanes) that are utilized at the time of x4 link.
(5)~(7) third signal lines (lanes) that are utilized at the time of x4 link of the lane reversal applied.
(8) fourth signal line (lane) that is utilized at the time of x8 link and x4 link of the lane reversal applied.

In FIG. 11, the reception signal line selection unit 202 has eight multiplexers having six inputs. The six inputs of each multiplexers 202-0~202-7 are defined from top of the Figure, as below.

(1) first signal line (lane) that is utilized at the time of x8 link and x4 link.
(2)~(3) second signal lines (lanes) that are utilized at the time of x4 link.
(4)~(5) third signal lines (lanes) that are utilized at the time of x4 link of the lane reversal applied.
(6) fourth signal line (lane) that is utilized at the time of x8 link and x4 link of the lane reversal applied.

As illustrated in FIG. 11, furthermore, the reception signal line selection unit 202 has delay (buffer) circuits for receiving the outputs of the multiplexers 203-0~203-7.

Figure 24:
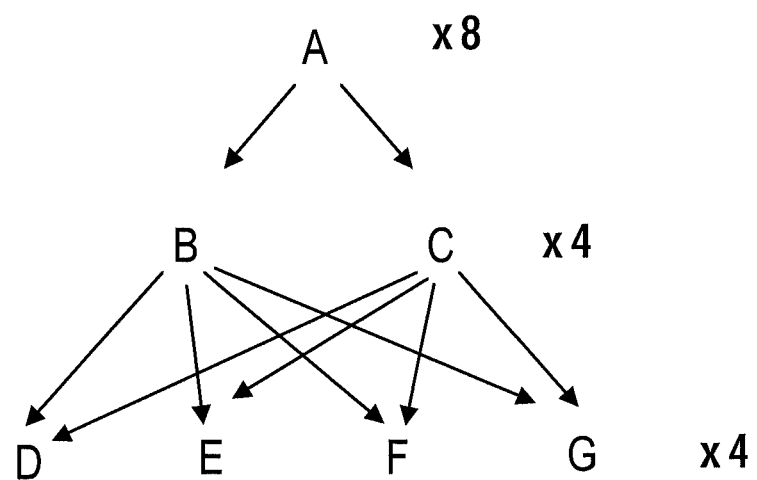
FIG. 24 is a flow diagram of another reduction process in a related art.

By above construction of the related art, the reduction is performed according to the description in FIG. 23 and FIG. 24 and x4 link can be constructed even though any two lanes are failed. However, large sized multiplexers are required in the signal line selection units 102 and 202 and a delay time is long. That is, for both sending and reception, four multiplexers 102-2~102-5 having eight inputs and eight multiplexers 202-0~202-7 having six inputs are required. Further, when operating in a high operating frequency, the timing adjustment is required by inserting a flip-flop circuit of one stage.

In contrary, in this embodiment, it is possible to construct both the signal line selection circuits 72 (87) and 82 (77) by four-input type multiplexer. Therefore, a circuit scale becomes small and this embodiment contributes a compact of a LSI (Large Scale Integrated circuit).

(A Second Embodiment of the Data Transfer Control Device)

Figure 12:
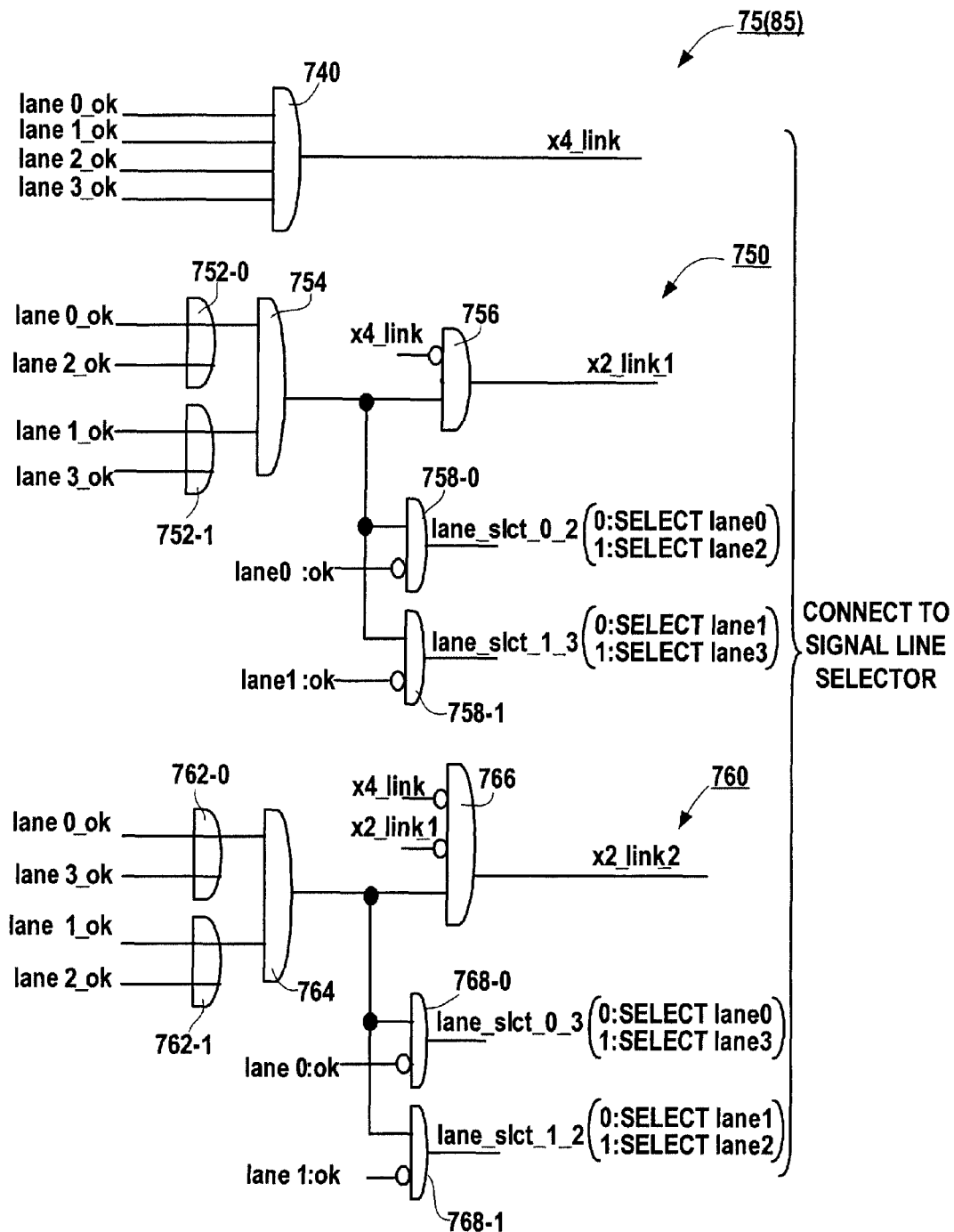
FIG. 12 is a circuit diagram of a second embodiment of the invention of a signal line control unit in FIG. 2.
Figure 13:
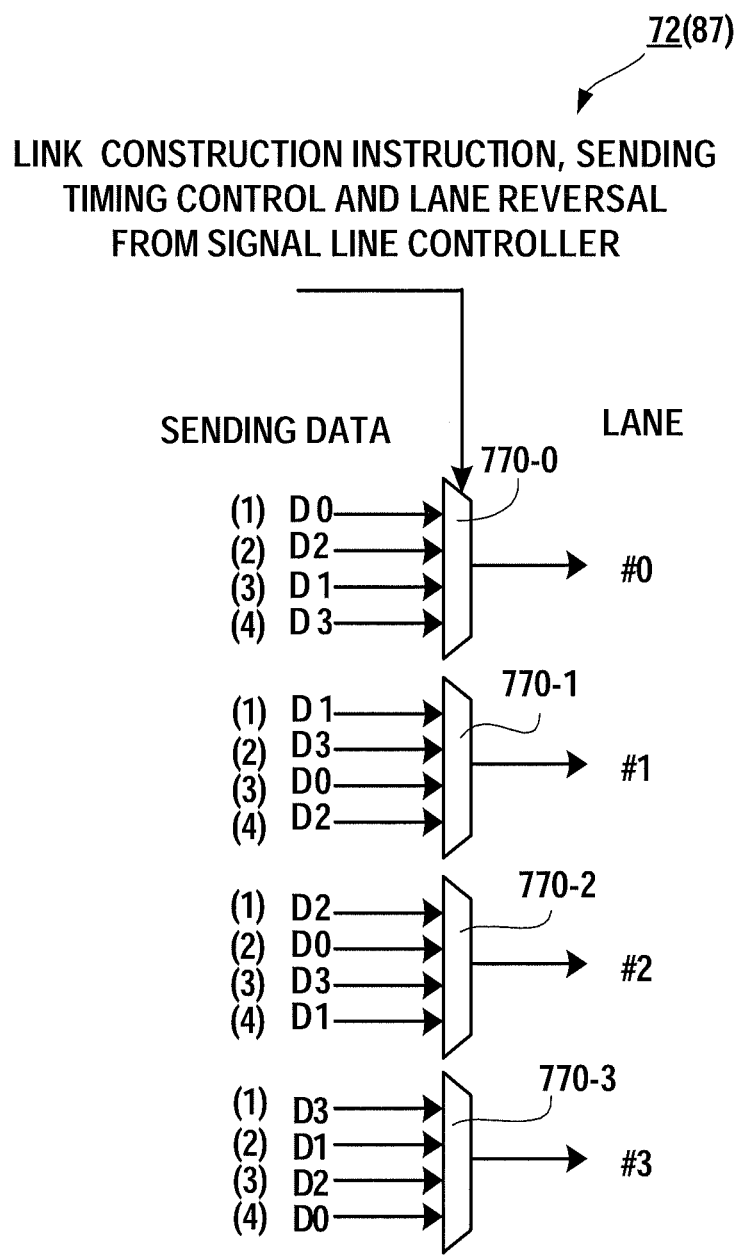
FIG. 13 is a circuit diagram of a second embodiment of a sending signal line selection unit in FIG. 2.
Figure 14:
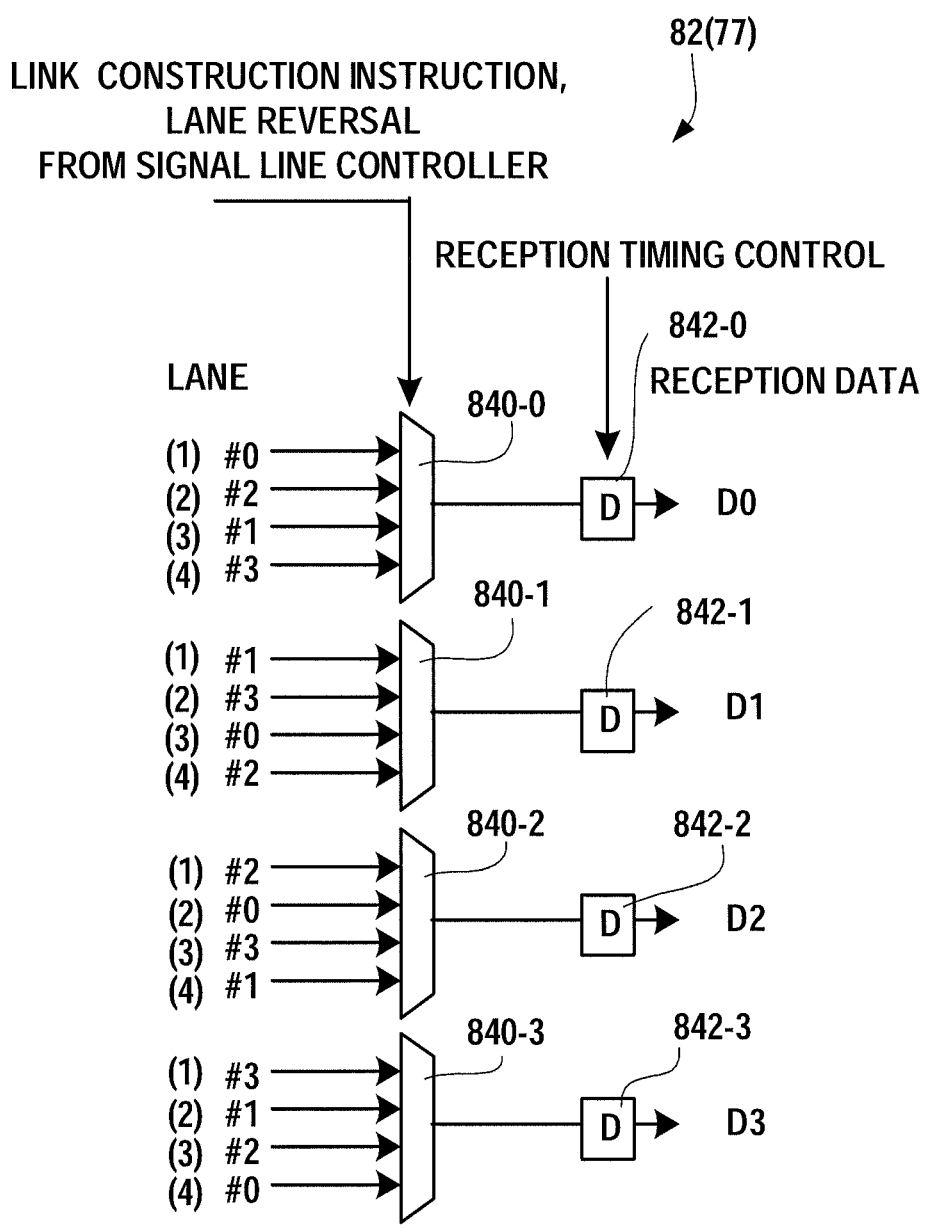
FIG. 14 is a circuit diagram of a second embodiment of a reception signal line selection unit in FIG. 2.

FIG. 12 illustrates a circuit diagram of the signal line control unit 75 (85) according to a second embodiment in FIG. 2. FIG. 13 illustrates a circuit diagram of the sending signal line selection unit 72 (87) in FIG. 2. FIG. 14 illustrates a circuit diagram of the reception signal line selection unit 82 (77) in FIG. 2. FIGS. 12-14 illustrate an example of four signal lines. Accordingly, the link construction has x4 link construction and x2 link construction at reduction.

In FIG. 12, the signal line control unit 75 (85) has a first circuit 740 that instructs the x4 (four) link construction when judging that all signal lines are not failed, a second circuit 750 that instructs the x2 (two) link construction when judging that any one lane is or both lanes are not failed in each of the lane group [#0, #2] and the lane group [#1, #3] and a third circuit 760 that instructs the x2 (two) link construction when judging that any one lane is or both lanes are not failed in each of the lane group [#0, #3] and the lane group [#1, #2].

The failure detection circuit 79 (89) as illustrated in FIG. 2 becomes the lane0 ok~lane3 ok signals to high level ("1") when not detecting the failure of each lanes #0~#3, and becomes the lane ok signal of the lane that is detected the failure to low level ("0") when detecting the failure of the lanes #0~#3.

The first circuit 740 has a AND circuit that arithmetic calculates a logical product of the lane0 ok signal~the lane3 ok signal. The second circuit 750 has a first OR circuit 752-0 that arithmetic calculates a logical sum of the lane0 ok signal and the lane2 ok signal of the lane group [#0, #2], a second OR circuit 752-1 that arithmetic calculates a logical sum of the lane1 ok signal and the lane3 ok signal of the lane group [#1, #3], and a AND circuit 754 that arithmetic calculates a logical product of the outputs from two OR circuits 752-0~752-1.

The second circuit 750 has a AND circuit 756 that arithmetic calculates a logical product of the output from the AND circuit 754 and a reverse signal of the x4 (four) link signal that instructs the x4 (four) link construction from the first circuit 740 and outputs x2 link1 signal that instructs x2 link construction, and two AND circuits 758-0~758-1 that each arithmetic calculates a logical product of the output of the AND circuit 754, a reverse signal of the lane0 ok signal of the lane#0 and a reverse signal of the lane1 ok signal of the lane#1.

Accordingly, the second circuit 750 outputs x2 link construction instruction from the AND circuit 756 and the lane select signals (lane_slct 0_2 and 1_3) in x2 link construction from the two AND circuits 758-0~758-1 when one lane is failed. That is, when two outputs of the two AND circuits 758-0~758-1 are '0', selections of the lanes #0 and #1 are instructed. And when the outputs of the two AND circuits 758-0~758-1 are '1', selections of the lanes #2 and #3 are instructed.

The third circuit 760 has, as same as the second circuit 750, a first OR circuit 762-0 that arithmetic calculates a logical sum of the lane0 ok signal and the lane3 ok signal of the lane group [#0, #3], a second OR circuit 762-1 that arithmetic calculates a logical sum of the lane1 ok signal and the lane2 ok signal of the lane group [#1, #2], and a AND circuit 764 that arithmetic calculates a logical product of the outputs from two OR circuits 762-0~762-1.

The third circuit 760 has a AND circuit 766 that arithmetic calculates a logical product of the output from the AND circuit 764, a reverse signal of the x4 (four) link signal that instructs the x4 (four) link construction from the first circuit 740 and x2 link 1 signal that instructs x2 link construction from the AND circuit 756, and outputs x2 link2 signal that instructs x2 link construction, and two AND circuits 768-0~768-1 that each arithmetic calculates a logical product of the output of the AND circuit 764 and a reverse signal of the lane0 ok signal of the lane#0, a reverse signal of the lane1 ok signal of the lane#1.

Accordingly, the third circuit 760 outputs x2 link construction instruction from the AND circuit 766 and the lane select signals (lane_slct 0_3 and 1_2) in x2 link construction from the two AND circuits 768-0~768-1 when x2 link 1 construction cannot be constructed and the x2 link 2 construction can be constructed. That is, when all the outputs of the two AND circuits 768-0~768-1 are '0', the two AND circuits 768-0~768-1 instruct selections of the lanes #0, #1. And when all the outputs of the two AND circuits 768-0~768-1 are '1', the two AND circuits 768-0~768-1 instruct selections of the lanes #3 and #2.

By this construction, x4 link construction is instructed when all signal lines (lanes) are not failed, because of the signal "x4_link"=1, signal "x2_link_1"=0 and the signal "x2_link_2"=0. And when any signal line is failed, x2 Link construction is instructed when any one or both signal lines of each lane group [#0, #2] and [#1, #3] is or are not failed, because of the signal "x4_link"=0, signal "x2_link_1"=1 and the signal "x2_link_2"=0.

Further, when the x2 link construction cannot be constructed by occurring a failure of the signal line in above x2 link construction, x2 Link construction is instructed when any one or both signal lines of each lane group [#0, #3] and [#1, #2] is or are not failed, because of the signal "x4_link"=0, signal "x2_link_1"=0 and the signal "x2_link_2"=1. Here, in this embodiment, young number lane is selected when both lanes of the group are not failed.

Next, the sending signal line selection circuit 72 (87) in FIG. 13 is explained. The sending signal line selection circuit 72 (87) has four (four lanes) multiplexers 770-0~770-3 that select one among four inputs (sending data). Four inputs of each multiplexers 770-0~770-1 are defined from top of the Figure, as below.

(1) first data that is utilized at the time of x4 link, x2 link 1, x2 link 2 and x2 link2 of the lane reversal applied.

(2) second data that is utilized at the time of x2 link 1, x2 link 2, and x2 link2 of the lane reversal applied.

(3) third data that is utilized at the time of x2 link1 of the lane reversal applied.

(4) fourth data that is utilized at the time of x4 link and x2 link1 of the lane reversal applied.

And four inputs of each multiplexers 770-2~770-3 are defined from top of the Figure, as below.

(1) first data that is utilized at the time of x4 link and x2 link1.

(2) second data that is utilized at the time of x2 link 1.

(3) third data that is utilized at the time of x2 link 2 and x2 link1 and 2 of the lane reversal applied.

(4) fourth data that is utilized at the time of x2 link 2 and x4 link, x2 link1 and x2 link2 of the lane reversal applied.

For example, in the first multiplexer 770-0, the input (1) is data D0, the input (2) is data D2, the input (3) is data D1 and the input (4) is data D3. As control signals, the link construction instruction, the lane select signals (x4 link, x2 link1 and the lane_slct 0_2, 1_3 and x2 link2 and the lane_slct 0_3, 1_2), sending timing signal at x2 link and the lane reversal instruction signal from the signal line control unit are input to all multiplexers 770-0~770-3.

According to these control signals, four multiplexers 770-0~770-3 select the input (1) and simultaneously outputs it to the four lanes 0~3 when x4 link construction instruction is '1' and the lane reversal instruction signal that instructs the lane reversal is '0' (not applied). And the four multiplexers 770-0~770-3 select the input (4) and simultaneously outputs it to the four lanes 0~3 when x4 link construction instruction is '1' and the lane reversal instruction signal that instructs the lane reversal is '1' (applied).

In the four multiplexers 770-0~770-3, two multiplexers are selected by the lane select signal lane_slct 0_2, 1_3 when x2 link1 construction instruction is '1'

The selected two multiplexers select the inputs (1) and (2) and sequentially outputs it to the lane according to the sending timing signal when the lane reversal instruction signal that instructs the lane reversal is '0' (not applied). And the selected two multiplexers select the inputs (3) and (4) and sequentially output it to the lane according to the sending timing signal when the lane reversal instruction signal that instructs the lane reversal is '1' (applied).

In the four multiplexers 770-0~770-3, two multiplexers are selected by the lane select signal lane_slct 0_3, 1_2 when x2 link2 construction instruction is '1'

In the selected two multiplexers, the multiplexers 770-0~770-1 select the inputs (1) and (2) or the multiplexers 770-2~770-3 select the inputs (3) and (4) and sequentially outputs it to the lane according to the sending timing signal when the lane reversal instruction signal that instructs the lane reversal is '0' (not applied). And in the selected two multiplexers, the multiplexers 770-0~770-1 select the inputs (1) and (2) or the multiplexers 770-2~770-2 select the inputs (3) and (4) and sequentially output it to the lane according to the sending timing signal when the lane reversal instruction signal that instructs the lane reversal is '1' (applied).

Next, the reception signal line selection circuit 82 (77) in FIG. 14 is explained. The reception signal line selection circuit 82 (77) has four (four lanes) multiplexers 840-0~840-3 that select one among four inputs (reception data from four lanes) and delay circuits (buffers) 842-0~842-3. Four inputs of each multiplexers 840-0~840-1 are defined from top of the Figure, as below.

(1) first signal line (lane) that is utilized at the time of x4 link, x2 link 1 and x2 link 2, and x2 link2 of the lane reversal applied.

(2) second signal line (lane) that is utilized at the time of x2 link 1.

(3) third signal line (lane) that is utilized at the time of x2 link1 of the lane reversal applied.

(4) fourth signal line (lane) that is utilized at the time of x2 link2 and x4 link and x2 link1 and x2 link2 of the lane reversal applied.

And four inputs of each multiplexers 840-2~840-3 are defined from top of the Figure, as below.

(1) first signal line (lane) that is utilized at the time of x4 link and x2 link 1.

(2) second signal line (lane) that is utilized at the time of x2 link 1 and x2 link2 and x2 link 2 of the lane reversal applied.

(3) third signal line (lane) that is utilized at the time of x2 link 2 and x2 link1 and 2 of the lane reversal applied.

(4) fourth signal line (lane) that is utilized at the time of x4 link, x2 link1 of the lane reversal applied.

For example, in the first multiplexer 840-0, the input (1) is the lane#0, the input (2) is the lane#2, the input (3) is the lane#1 and the input (4) is the lane #3. As control signals, the link construction instruction, the lane select signals (x4 link, x2 link1 and the lane_slct 0_2, 1_3 and x2 link2 and the lane_slct 0_3, 1_2), and the lane reversal instruction signal from the signal line control unit are input to all multiplexers 840-0~840-3.

According to these control signals, four multiplexers 840-0~840-3 select the input (1) and outputs it to the delay circuits 842-0~842-3 respectively when x4 link construction instruction is '1' and the lane reversal instruction signal that instructs the lane reversal is '0' (not applied). And the four multiplexers 840-0~840-3 select the input (4) and outputs it to the delay circuit 842-0~842-3 respectively when x4 link construction instruction is '1' and the lane reversal instruction signal that instructs the lane reversal is '1' (applied).

In the four multiplexers 840-0~840-3, two multiplexers are selected by the lane select signal lane_slct 0_2, 1_3 when x2 link1 construction instruction is '1'

The selected two multiplexers select the inputs (1) or (2) and output it when the lane reversal instruction signal that instructs the lane reversal is '0' (not applied). And the selected two multiplexers select the inputs (3) or (4) and output it when the lane reversal instruction signal that instructs the lane reversal is '1' (applied).

In the four multiplexers 840-0~840-3, two multiplexers are selected by the lane select signal lane_slct 0_3, 1_2 when x2 link2 construction instruction is '1'

In the selected two multiplexers, when the multiplexers 840-0~840-1 are selected, the multiplexers 840-0~840-1 select the inputs (1) or (4) and when the multiplexers 840-2~840-3 are selected, the multiplexers 840-2~840-3 select the inputs (2) or (3) and the selected multiplexers outputs it when the lane reversal instruction signal that instructs the lane reversal is '0' (not applied). And in the selected two multiplexers, the multiplexers 820-0~820-1 select the inputs (1) or (4) or the multiplexers 820-2~820-3 select the inputs (2) or (3) and output it when the lane reversal instruction signal that instructs the lane reversal is '1' (applied).

The delay circuits 842-0~842-3 latch the outputs of each multiplexers 840-0~840-3 by the reception timing signal.

In this four lane construction, as same as eight lane construction, it is possible to continue data transfer by reducing a half link width and to prevent that the size of the multiplexer becomes large. Therefore it is prevented that a circuit scale becomes large and it is possible to improve the operating frequency.

(A Third Embodiment of the Data Transfer Control Device)

Figure 15:
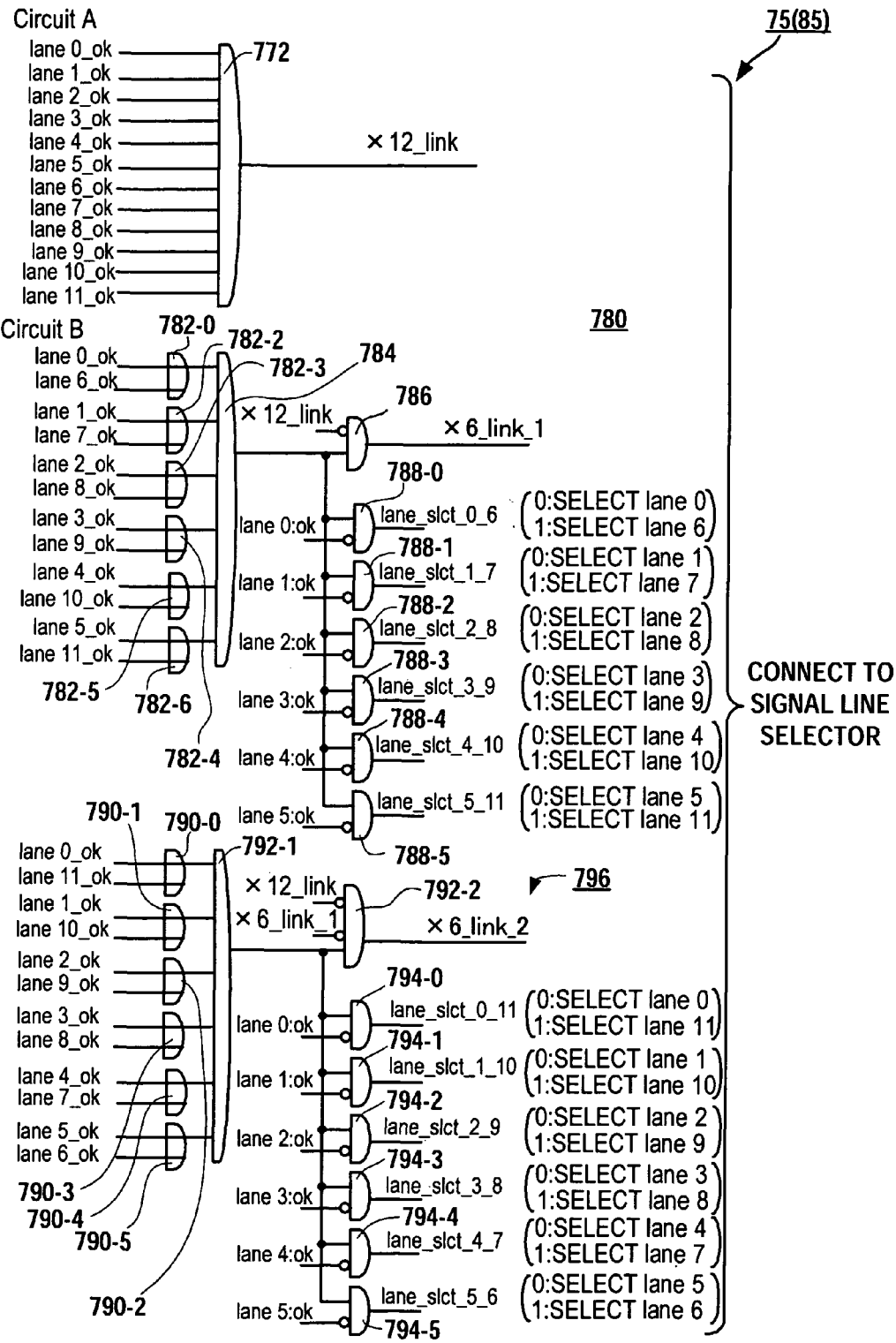
FIG. 15 is a circuit diagram of a third embodiment of the invention of a signal line control unit in FIG. 2.
Figure 16:
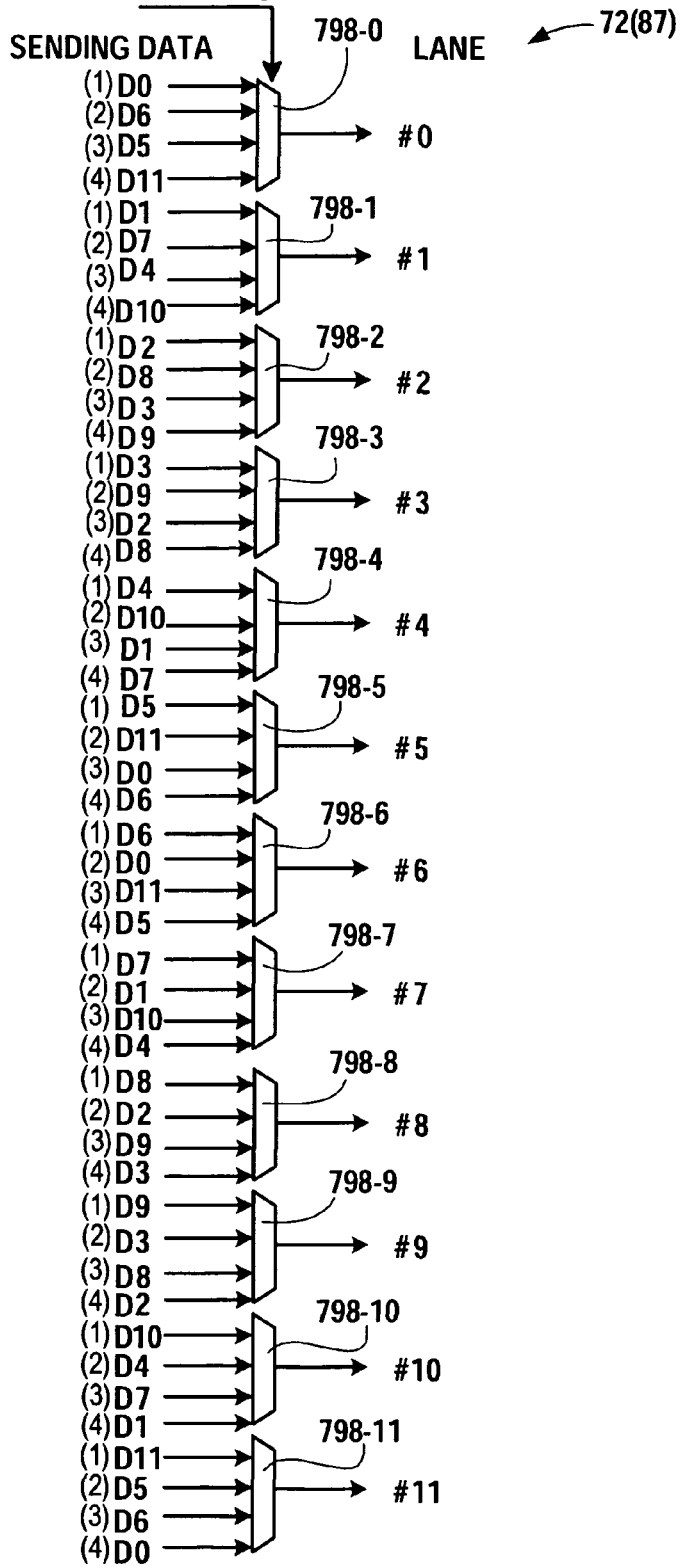
FIG. 16 is a circuit diagram of a third embodiment of a sending signal line selection unit in FIG. 2.
Figure 17:
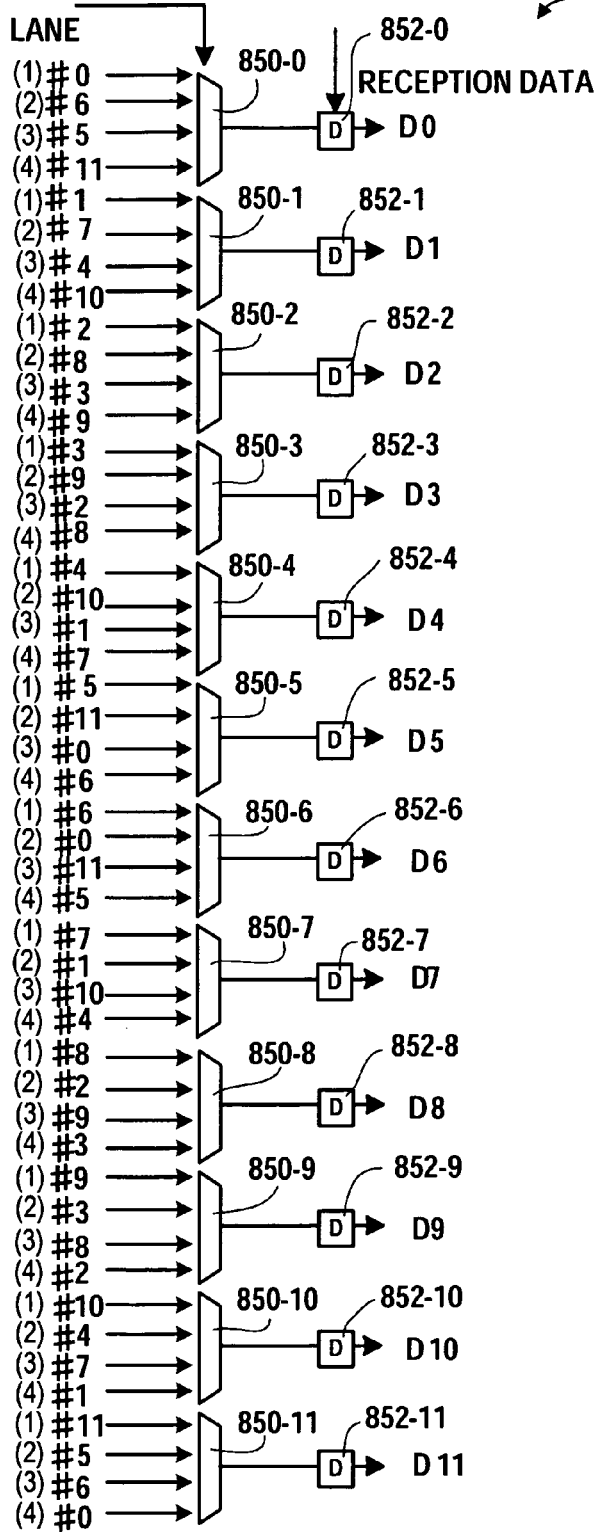
FIG. 17 is a circuit diagram of a third embodiment of a reception signal line selection unit in FIG. 2.
Figure 18:
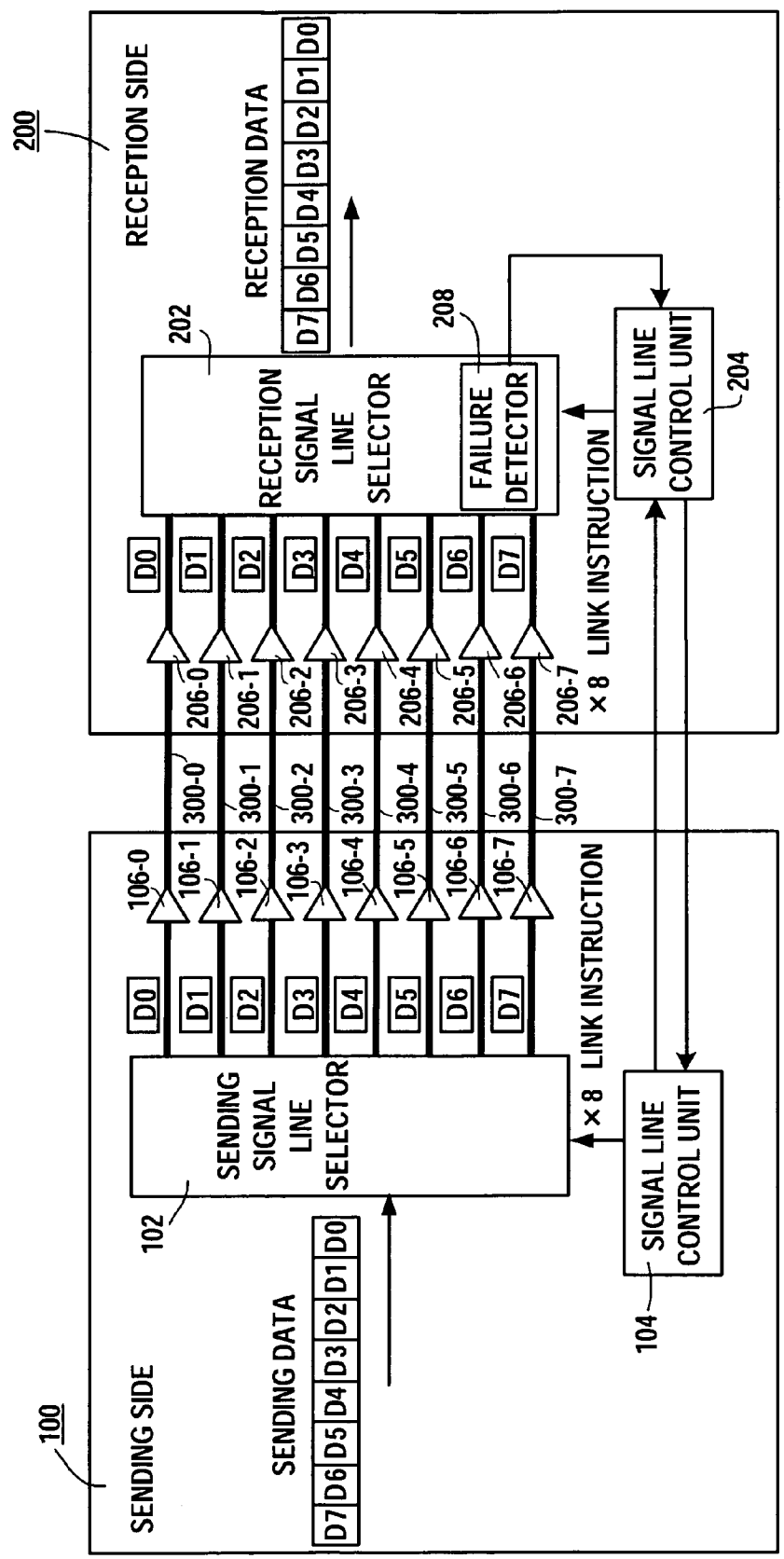
FIG. 18 is a block diagram of a data transfer system.
Figure 19:
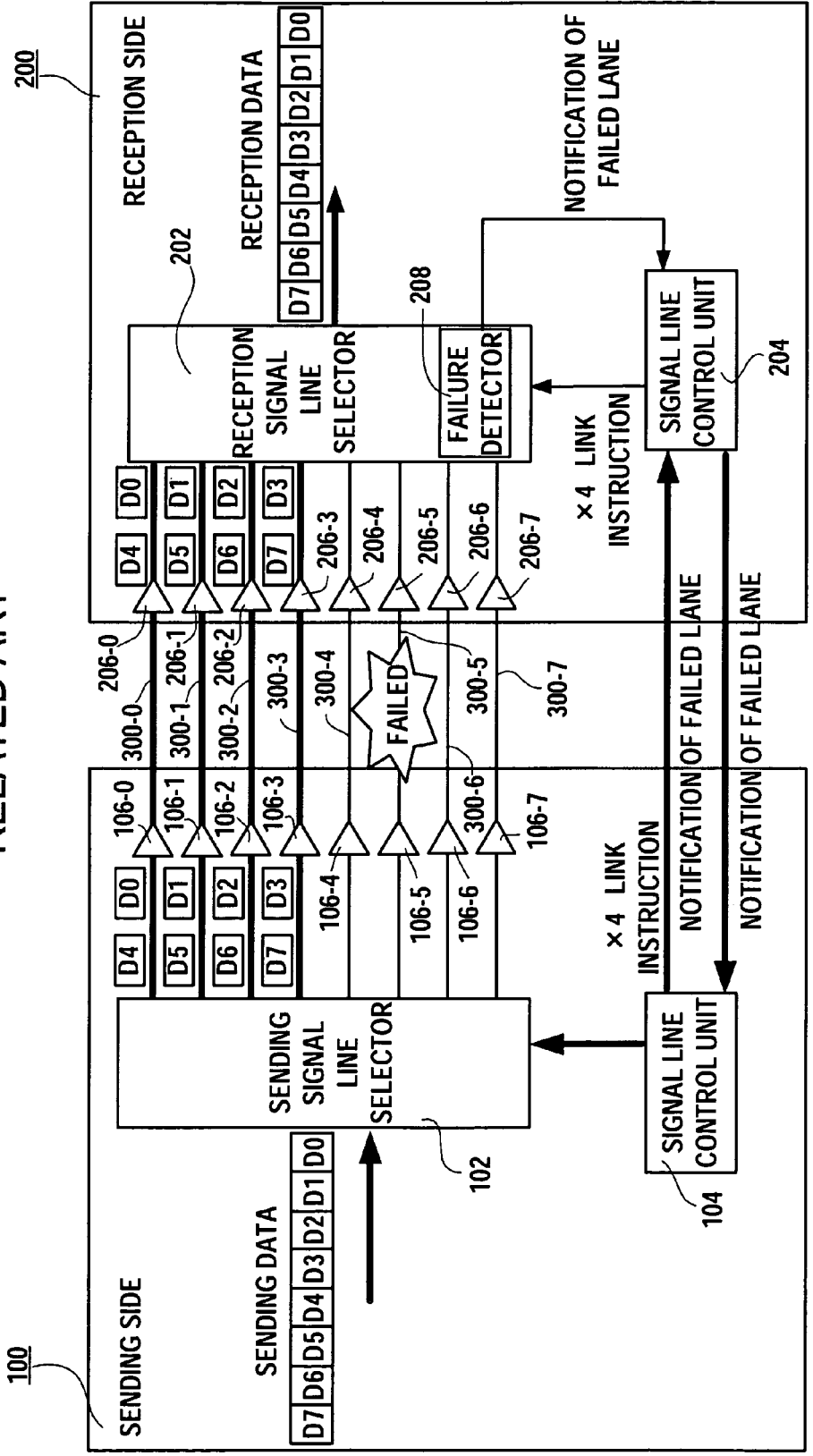
FIG. 19 is an explanatory diagram of a data transfer system at a reduction in FIG. 18.
Figure 21:
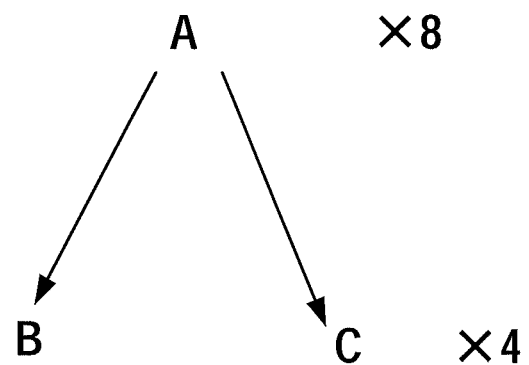
FIG. 21 is a flow diagram of a reduction process in a related art.

FIG. 15 illustrates a circuit diagram of the signal line control unit 75 (85) according to a third embodiment in FIG. 2. FIG. 16 illustrates a circuit diagram of the sending signal line selection unit 72 (87) according to a third embodiment in FIG. 2. FIG. 17 illustrates a circuit diagram of the reception signal line selection unit 82 (77) according to a third embodiment in FIG. 2. FIGS. 15-17 illustrate an example of twelve signal lines.

In FIG. 15, the signal line control unit 75 (85) has a first circuit 772 that instructs the x12 (twelve) link construction when judging that all signal lines are not failed, a second circuit 780 that instructs the x6 (six) link construction when judging that any one lane is or both lanes are not failed in each of the lane groups [#0, #6], [#1, #7], [#2, #8], [#3, #9], [#4, #10] and [#5, #11] and a third circuit 796 that instructs the x6 (six) link construction when judging that any one lane is or both lanes are not failed in each of the lane groups [#0, #11], [#1, #10], [#2, #9], [#3, #8], [#4, #7] and [#5, #6].

The failure detection circuit 79 (89) as illustrated in FIG. 2 becomes the lane0 ok~lane11 ok signals to high level ("1") when not detecting the failure of each lanes #0~#11, and becomes the lane ok signal of the lane that is detected the failure to low level ("0") when detecting the failure of the lanes #0~#11.

The first circuit 772 has a AND circuit that arithmetic calculates a logical product of the lane0 ok signal~the lane11 ok signal. The second circuit 780 has a first OR circuit 782-0 that arithmetic calculates a logical sum of the lane0 ok signal and the lane6 ok signal of the lane group [#0, #6], a second OR circuit 782-2 that arithmetic calculates a logical sum of the lane1 ok signal and the lane7 ok signal of the lane group [#1, #7], a third OR circuit 782-3 that arithmetic calculates a logical sum of the lane2 ok signal and the lane8 ok signal of the lane group [#2, #8], a fourth OR circuit 782-4 that arithmetic calculates a logical sum of the lane3 ok signal and the lane9 ok signal of the lane group [#3, #9], a fifth OR circuit 782-5 that arithmetic calculates a logical sum of the lane4 ok signal and the lane10 ok signal of the lane group [#4, #10], a sixth OR circuit 782-6 that arithmetic calculates a logical sum of the lane5 ok signal and the lane11 ok signal of the lane group [#5, #11], and a AND circuit 784 that arithmetic calculates a logical product of the outputs from six OR circuits 782-0, 782-2~752-6.

The second circuit 780 has a AND circuit 786 that arithmetic calculates a logical product of the output from the AND circuit 784 and a reverse signal of the x12 (twelve) link signal that instructs the x12 (twelve) link construction from the first circuit 772 and outputs x8 link1 signal that instructs x8 link construction, and six AND circuits 788-0~788-5 that each arithmetic calculates a logical product of the output of the AND circuit 784, a reverse signal of the lane0 ok signal of the lane#0, a reverse signal of the lane1 ok signal of the lane#1, a reverse signal of the lane2 ok signal of the lane#2, a reverse signal of the lane3 ok signal of the lane#3, a reverse signal of the lane4 ok signal of the lane#4 and a reverse signal of the lane5 ok signal of the lane#5.

Accordingly, the second circuit 780 outputs x6 link construction instruction from the AND circuit 786 and the lane select signals (lane_slct 0_6, 1_7, 2_8, 3_9, 4_10 and 5_11) in x6 link construction from the six AND circuits 788-0~788-5 when one lane is failed. That is, when six outputs of the six AND circuits 788-0~788-5 are '0', selections of the lanes #0, #1, #2, #3, #4 and #5 are instructed. And when the outputs of the six AND circuits 788-0~788-1 are '1', selections of the lanes #6, #7, #8, #9, #10 and #11 are instructed.

The third circuit 796 has, as same as the second circuit 780, a first OR circuit 790-0 that arithmetic calculates a logical sum of the lane0 ok signal and the lane11 ok signal of the lane group [#0, #11], a second OR circuit 790-1 that arithmetic calculates a logical sum of the lane1 ok signal and the lane10 ok signal of the lane group [#1, #10], a third OR circuit 790-2 that arithmetic calculates a logical sum of the lane2 ok signal and the lane9 ok signal of the lane group [#2, #9], a fourth OR circuit 790-3 that arithmetic calculates a logical sum of the lane3 ok signal and the lane8 ok signal of the lane group [#3, #8], a fifth OR circuit 790-4 that arithmetic calculates a logical sum of the lane4 ok signal and the lane7 ok signal of the lane group [#4, #7], a sixth OR circuit 790-5 that arithmetic calculates a logical sum of the lane5 ok signal and the lane11 ok signal of the lane group [#5, #11], and a AND circuit 792-1 that arithmetic calculates a logical product of the outputs from six OR circuits 790-0~790-5.

The third circuit 796 has a AND circuit 792-2 that arithmetic calculates a logical product of the output from the AND circuit 792-1, a reverse signal of the x12 (twelve) link signal that instructs the x12 (twelve) link construction from the first circuit 772 and x6 link 1 signal that instructs x6 link construction from the AND circuit 786, and outputs x6 link2 signal that instructs x6 link construction, and six AND circuits 794-0~794-5 that each arithmetic calculates a logical product of the output of the AND circuit 792-1 and a reverse signal of the lane0 ok signal of the lane#0, a reverse signal of the lane1 ok signal of the lane#1, a reverse signal of the lane2 ok signal of the lane#2, a reverse signal of the lane3 ok signal of the lane#3, a reverse signal of the lane4 ok signal of the lane#0, a reverse signal of the lane1 ok signal of the lane#5.

Accordingly, the third circuit 796 outputs x6 link construction instruction from the AND circuit 792-2 and the lane select signals (lane_slct 0_11, 1_10, 2_9, 3_8, 4_7 and 5_6) in x6 link construction from the SIX AND circuits 794-0~794-5 when x6 link 1 construction cannot be constructed and the x6 link 2 construction can be constructed. That is, when all the outputs of the six AND circuits 794-0~794-5 are '0', the six AND circuits 794-0~794-5 instruct selections of the lanes #0, #1, #2, #3, #4, #5. And when all the outputs of the six AND circuits 794-0~794-5 are '1', the six AND circuits 794-0~794-5 instruct selections of the lanes #11, #10, #9, #8, #7 and #6.

By this construction, x12 link construction is instructed when all signal lines (lanes) are not failed, because of the signal "x12_link"=1, signal "x6_link_1"=0 and the signal "x6_link_2"=0. And when any signal line is failed, x6 Link construction is instructed when any one or both signal lines of each lane group [#0, #6], [#1, #7], [#2, #8], [#3, #9], [#4, #10] and [#5, #11] is or are not failed, because of the signal "x12_link"=0, signal "x6_link_1"=1 and the signal "x6_link_2"=0.

Further, when the x6 link construction cannot be constructed by occurring a failure of the signal line in above x6 link construction, x6 Link construction is instructed when any one or both signal lines of each lane group [#0, #11], [#1, #10], [#2, #9], [#3, #8], [#4, #7] and [#5, #6] is or are not failed, because of the signal "x12_link"=0, signal "x6_link_1"=0 and the signal "x6_link_2"=1. Here, in this embodiment, young number lane is selected when both lanes of the group are not failed.

Next, the sending signal line selection circuit 72 (87) in FIG. 16 is explained. The sending signal line selection circuit 72 (87) has twelve (twelve lanes) multiplexers 798-0~798-11 that select one among four inputs (sending data). Four inputs of each multiplexers 798-0~798-5 are defined from top of the Figure, as below.

(1) first data that is utilized at the time of x12 link, x6 link 1, x6 link 2 and x6 link2 of the lane reversal applied.

(2) second data that is utilized at the time of x6 link 1, x6 link 2, and x6 link2 of the lane reversal applied.

(3) third data that is utilized at the time of x6 link1 of the lane reversal applied.

(4) fourth data that is utilized at the time of x12 link and x6 link1 of the lane reversal applied.

And four inputs of each multiplexers 798-6~798-11 are defined from top of the Figure, as below.

(1) first data that is utilized at the time of x12 link and x6 link2.

(2) second data that is utilized at the time of x6 link 2.

(3) third data that is utilized at the time of x6 link 2 and x6 link1 and 2 of the lane reversal applied.

(4) fourth data that is utilized at the time of x6 link 2 and x12 link, x6 link1 and x6 link2 of the lane reversal applied.

For example, in the first multiplexer 798-0, the input (1) is data D0, the input (2) is data D6, the input (3) is data D5 and the input (4) is data D11. As control signals, the link construction instruction, the lane select signals (x12 link, x6 link1 and the lane_slct 0_6, 1_7, 2_8, 3_9, 4_10, 5_11 and x6 link2 and the lane_slct 0_11, 1_10, 2_9, 3_8, 4_7, 5_6), sending timing signal at x6 link and the lane reversal instruction signal from the signal line control unit are input to all multiplexers 798-0~798-11.

According to these control signals, twelve multiplexers 798-0~798-11 select the input (1) and simultaneously outputs it to the twelve lanes 0~11 when x12 link construction instruction is '1' and the lane reversal instruction signal that instructs the lane reversal is '0' (not applied). And the twelve multiplexers 798-0~798-11 select the input (4) and simultaneously outputs it to the twelve lanes 0~11 when x12 link construction instruction is '1' and the lane reversal instruction signal that instructs the lane reversal is '1' (applied).

In the twelve multiplexers 798-0~798-11, six multiplexers are selected by the lane select signal lane_slct 0_6, 1_7, 2_8, 3_9, 4_10, 5_11 when x6 link1 construction instruction is '1'.

The selected six multiplexers select the inputs (1) and (2) and sequentially outputs it to the lane according to the sending timing signal when the lane reversal instruction signal that instructs the lane reversal is '0' (not applied). And the selected six multiplexers select the inputs (3) and (4) and sequentially output it to the lane according to the sending timing signal when the lane reversal instruction signal that instructs the lane reversal is '1' (applied).

In the twelve multiplexers 798-0~798-11, six multiplexers are selected by the lane select signal lane_slct 0_11, 1_10, 2_9, 3_8, 4_7, 5_6 when x6 link2 construction instruction is '1'.

In the selected six multiplexers, the multiplexers 798-0~798-5 select the inputs (1) and (2) or the multiplexers 798-6~798-11 select the inputs (3) and (4) and sequentially outputs it to the lane according to the sending timing signal when the lane reversal instruction signal that instructs the lane reversal is '0' (not applied). And in the selected six multiplexers, the multiplexers 798-0~798-5 select the inputs (1) and (2) or the multiplexers 798-6~798-11 select the inputs (3) and (4) and sequentially output it to the lane according to the sending timing signal when the lane reversal instruction signal that instructs the lane reversal is '1' (applied).

Next, the reception signal line selection circuit 82 (77) in FIG. 17 is explained. The reception signal line selection circuit 82 (77) has twelve (twelve lanes) multiplexers 850-0~850-11 that select one among four inputs (reception data from four lanes) and delay circuits (buffers) 852-0~852-11. Four inputs of each multiplexers 850-0~850-11 are defined from top of the Figure, as below.

(1) first signal line (lane) that is utilized at the time of x12 link, x6 link 1 and x6 link 2, and x6 link2 of the lane reversal applied.

(2) second signal line (lane) that is utilized at the time of x6 link 1.

(3) third signal line (lane) that is utilized at the time of x6 link1 of the lane reversal applied.

(4) fourth signal line (lane) that is utilized at the time of x6 link2 and x12 link and x6 link1 and x6 link2 of the lane reversal applied.

And four inputs of each multiplexers 850-6~850-11 are defined from top of the Figure, as below.

(1) first signal line (lane) that is utilized at the time of x12 link, x6 link 1 and x6 link 2.

(2) second signal line (lane) that is utilized at the time of x6 link 1 and x6 link2 and x6 link 2 of the lane reversal applied.

(3) third signal line (lane) that is utilized at the time of x6 link 2 and x6 link1 and x6 link2 of the lane reversal applied.

(4) fourth signal line (lane) that is utilized at the time of x12 link, x6 link1 of the lane reversal applied.

For example, in the first multiplexer 850-0, the input (1) is the lane#0, the input (2) is the lane#6, the input (3) is the lane#5, and the input (4) is the lane #11. As control signals, the link construction instruction, the lane select signals (x12 link, x6 link1 and the lane_slct 0_6, 1_7, 2_8, 3_9, 4_10, 5_11 and x6 link2 and the lane_slct 0_11, 1_10, 2_9, 3_8, 4_7, 5_6), and the lane reversal instruction signal from the signal line control unit are input to all multiplexers 850-0~850-11.

According to these control signals, twelve multiplexers 850-0~850-11 select the input (1) and outputs it to the delay circuits 850-0~850-11 respectively when x12 link construction instruction is '1' and the lane reversal instruction signal that instructs the lane reversal is '0' (not applied). And the twelve multiplexers 850-0~850-11 select the input (4) and outputs it to the delay circuit 850-0~850-11 respectively when x12 link construction instruction is '1' and the lane reversal instruction signal that instructs the lane reversal is '1' (applied).

In the twelve multiplexers 850-0~850-11, six multiplexers (lanes) are selected by the lane select signal lane_slct 0_6, 1_7, 2_8, 3_9, 4_10, 5_11 when x6 link1 construction instruction is '1'.

The selected six multiplexers select the inputs (1) or (2) and output it when the lane reversal instruction signal that instructs the lane reversal is '0' (not applied). And the selected six multiplexers select the inputs (3) or (4) and output it when the lane reversal instruction signal that instructs the lane reversal is '1' (applied).

In the six multiplexers 850-0~850-11, six multiplexers are selected by the lane select signal lane_slct 0_11, 1_10, 2_9, 3_8, 4_7, 5_6 when x6 link2 construction instruction is '1'.

In the selected six multiplexers, when the multiplexers 850-0~850-5 are selected, the multiplexers 850-0~850-5 select the inputs (1) or (4) and when the multiplexers 850-6~850-11 are selected, the multiplexers 850-6~850-11 select the inputs (2) or (3) and the selected multiplexers outputs it when the lane reversal instruction signal that instructs the lane reversal is '0' (not applied). And in the selected six multiplexers, the multiplexers 850-0~850-5 select the inputs (1) or (4) or the multiplexers 850-6~850-11 select the inputs (2) or (3) and output it when the lane reversal instruction signal that instructs the lane reversal is '1' (applied).

The delay circuits 852-0~852-11 latch the outputs of each multiplexers 850-0~850-11 by the reception timing signal.

In this twelve lane construction, as same as eight lane construction, it is possible to continue data transfer by reducing a half link width and to prevent that the size of the multiplexer becomes large. Therefore it is prevented that a circuit scale becomes large and it is possible to improve the operating frequency. In this way, the embodiments are utilized that the lane width is 2N (N is integer).

The Other Embodiments

In the above embodiments, the examples are described when a number of lane is four, eight and twelve. However, the invention is applied in case that a number of lane at reduction is a multiple of two, such as sixteen, twenty, twenty four, twenty eight, thirty two and thirty six. And the examples of data transfer of both sending and reception are described, but one of the sending and reception is applied. The reduction width may be applied to the link width of half or quarter if the transfer speed is within an allowable range.

In this way, since a first circuit that creates a first selection signal indicating that any one or both signal line of a pair of reduction signal line and no-reduction signal line is or are not failed and a second circuit that creates a second selection signal indicating that any one or both signal line of a pair of signal lines, that is changed at lane reversal, is or are not failed, are provided, it is possible to continue data transfer by reducing a half link width even though two signal lines are failed and the lane reversal is executed. And it is possible to prevent that the size of the multiplexer becomes large. Therefore it is prevented that a circuit scale becomes large and it is possible to improve the operating frequency.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

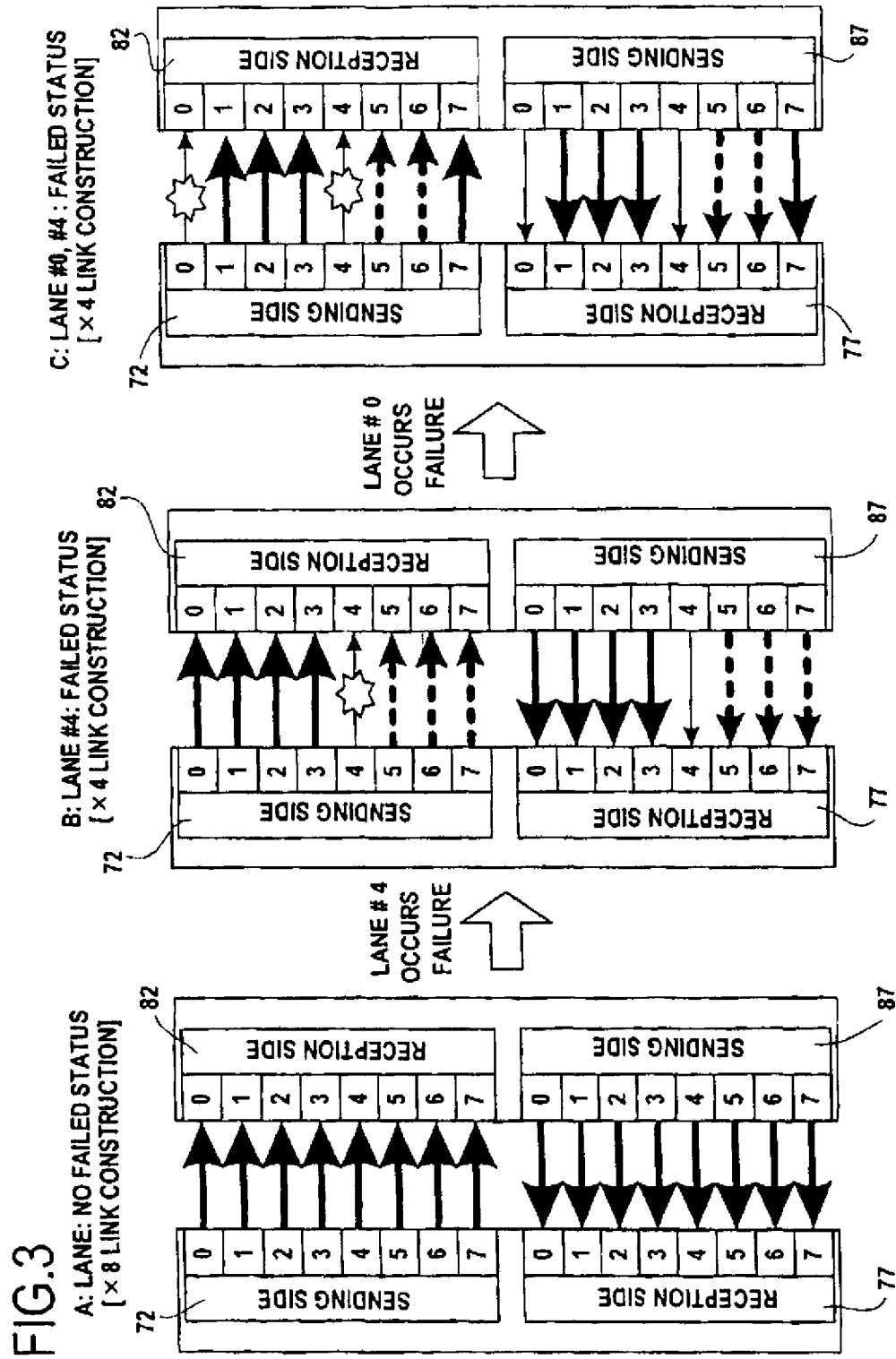

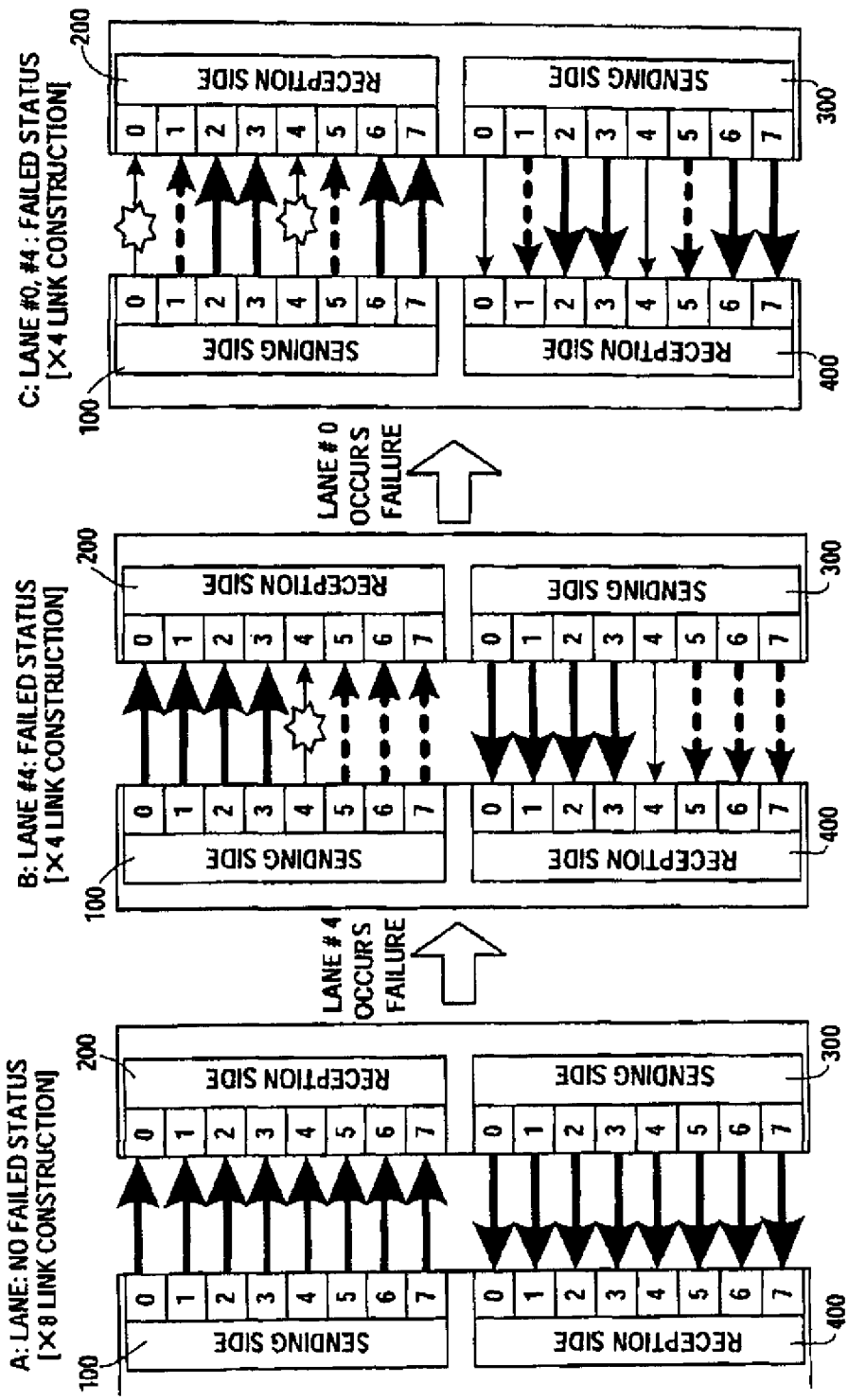

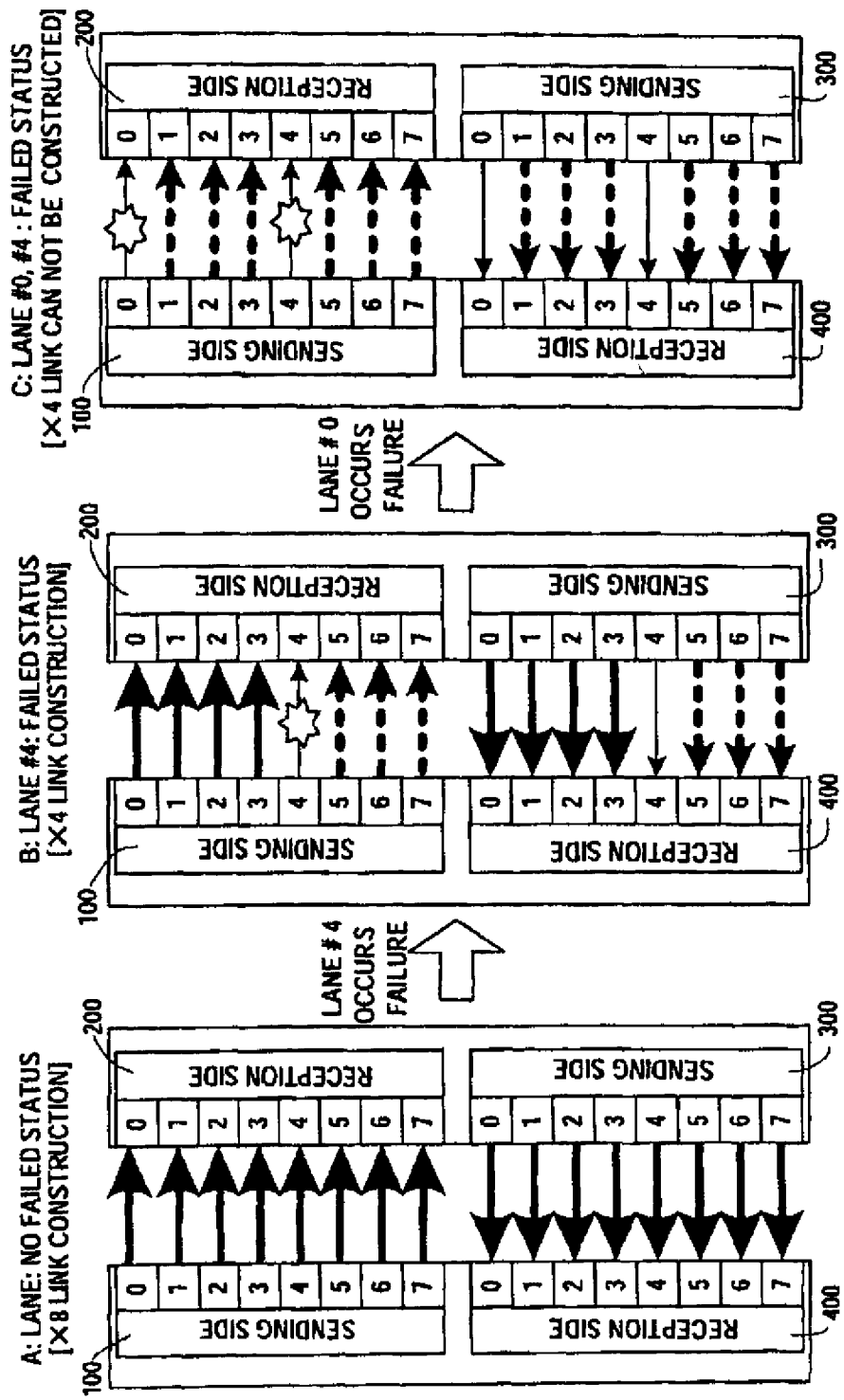

What is claimed is:

1. A data transfer system for transferring data between devices connected via a plurality of signal lines, comprising:

a sending signal line selection unit that selects signal lines for data transferring among the plurality of signal lines and sends data via the selected signal lines;

a reception signal line selection unit that receives the data via the selected signal lines;

an abnormality detection unit that detects whether the selected signal lines are abnormal; and a signal line control unit that controls so that the sending signal line selection unit and the reception signal line selection unit select signal lines except an abnormal detected signal line according to an abnormal detection from the abnormal detection unit, wherein the signal line control unit comprises a signal creation unit that creates a first selection signal indicating that any one or both signal line of a first pair of combination of reduction signal line and no-reduction signal line is or are not failed when the signal lines are reduced according to the abnormal detection from the abnormal detection unit, and a signal output unit that outputs a second selection signal indicating that any one or both signal line of a second pair of signal lines is or are not failed when a connection of the second selection signal indicating that any one or both signal line of a second pair of signal lines is changed in case of a lane reversal that connects a plurality of signal lines in a down order from a highest bit to a lowest bit of a sending device side with a plurality of signal in a up order from a highest bit to a lowest bit of a reception device side.

2. The data transfer system according to claim 1, wherein the sending signal line control unit comprises a plurality of multiplexers provided to each of the plurality of signal lines that input a plurality of data and output selected data according to the first and the second selection signals, respectively, and
the reception signal line control unit comprises a plurality of multiplexers connected to the plurality of signal lines that select data from the plurality of signal lines according to the first and the second selection signals, respectively.

3. The data transfer system according to claim 1, wherein the sending signal line selection unit and the reception signal line selection unit further receives a lane reversal instruction signal that indicates an execution of the lane reversal and selects the plurality of signal lines according to the first, the second selection signals and the lane reversal instruction signal.

4. The data transfer system according to claim 1, wherein the abnormality detection unit notifies a third signal that indicates whether each of the plurality of signal lines are abnormal to the signal line control unit, and
the signal line control unit creates the first and the second selection signals by using the third signal.

5. The data transfer system according to claim 4, the signal line control unit further comprises a selection signal creation circuit that creates a fourth signal that indicates that all the plurality of signal lines are not abnormal from the third signal.

6. The data transfer system according to claim 4, the signal creation unit of the signal line control unit comprises:
2N number of OR circuits that arithmetic calculate a logical sum of the third signals of the reduction signal line and the no-reduction signal line; and
an AND circuit that arithmetic calculates a logical product of outputs of the 2N number of OR circuits.

7. The data transfer system according to claim 4, the signal output unit of the signal line control unit comprises:
2N number of OR circuits that arithmetic calculate a logical sum of the third signals of the pair of the signal lines that are changed at the lane reversal; and
an AND circuit that arithmetic calculates a logical product of outputs of the 2N number of OR circuits.

8. The data transfer system according to claim 6, the signal creation unit of the signal line control unit further comprises 2N number of AND circuits that arithmetic calculates a logical product of outputs of the AND circuit and a reverse signal of the third signal of the signal line that does not reduce and outputs a fourth signal that indicates the signal line that reduces.

9. The data transfer system according to claim 7, the signal output unit of the signal line control unit further comprises 2N number of AND circuits that arithmetic calculates a logical product of outputs of the AND circuit and a reverse signal of the third signal of the signal line that does not reduce and outputs a fifth signal that indicates the signal line that reduces at the lane reversal.

10. A reception device of a data transfer system that receives transferred data from a sending device via a plurality of signal lines, comprising:
a reception signal line selection unit that receives the data via a plurality of signal lines selected among the plurality of signal lines as signal lines for data transferring;
an abnormality detection unit that detects whether the selected signal lines are abnormal; and
a signal line control unit that controls so that the reception signal line selection unit selects signal lines except an abnormal detected signal line according to an abnormal detection from the abnormal detection unit,
wherein the signal line control unit comprises:
a signal creation unit that creates a first selection signal indicating that any one or both signal line of a first pair of combination of reduction signal line and no-reduction signal line is or are not failed when the signal lines are reduced according to the abnormal detection from the abnormal detection unit; and
a signal output unit that outputs a second selection signal indicating that any one or both signal line of a second pair of signal lines is or are not failed when a connection of the second selection signal indicating that any one or both signal line of a second pair of signal lines is changed in case of a lane reversal that connects a plurality of signal lines in a down order from a highest bit to a lowest bit of a sending device side with a plurality of signal in a up order from a highest bit to a lowest bit of a reception device side.

11. The reception device of the data transfer system according to claim 10, the reception signal line control unit comprises a plurality of multiplexers connected to the plurality of signal lines that select data from the plurality of signal lines according to the first and the second selection signals, respectively.

12. The reception device of the data transfer system according to claim 10, wherein the reception signal line selection unit further receives a lane reversal instruction signal that indicates an execution of the lane reversal and selects the plurality of signal lines according to the first, the second selection signals and the lane reversal instruction signal.

13. The reception device of the data transfer system according to claim 10, wherein the abnormality detection unit notifies a third signal that indicates whether each of the plurality of signal lines are abnormal to the signal line control unit, and
the signal line control unit creates the first and the second selection signals by using the third signal.

14. The reception device of the data transfer system according to claim 13, wherein the signal line control unit further comprises a selection signal creation circuit that creates a fourth signal that indicates that all the plurality of signal lines are not abnormal from the third signal.

15. The reception device of the data transfer system according to claim 13, the signal creation unit of the signal line control unit comprises:
2N number of OR circuits that arithmetic calculate a logical sum of the third signals of the reduction signal line and the no-reduction signal line; and
an AND circuit that arithmetic calculates a logical product of outputs of the 2N number of OR circuits.

16. The reception device of the data transfer system according to claim 13, the signal output unit of the signal line control unit comprises:
2N number of OR circuits that arithmetic calculate a logical sum of the third signals of the pair of the signal lines that are changed at the lane reversal; and
an AND circuit that arithmetic calculates a logical product of outputs of the 2N number of OR circuits.

17. The reception device of the data transfer system according to claim 15, the signal creation unit of the signal line control unit further comprises 2N number of AND circuits that arithmetic calculates a logical product of outputs of the AND circuit and a reverse signal of the third signal of the signal line that does not reduce and outputs a fourth signal that indicates the signal line that reduces.

18. The reception device of the data transfer system according to claim 16, the signal output unit of the signal line control unit further comprises 2N number of AND circuits that arithmetic calculates a logical product of outputs of the AND circuit and a reverse signal of the third signal of the signal line that does not reduce and outputs a fifth signal that indicates the signal line that reduces at the lane reversal.

19. A control method of a data transfer system for transferring data between devices connected via a plurality of signal lines, comprising:

selecting signal lines for data transferring among the plurality of signal lines;
sending data via the selected signal lines:
receiving the data via the selected signal lines;
detecting whether the selected signal lines are abnormal; and
selecting signal lines except an abnormal detected signal line based on the detecting;
wherein the selecting comprises
creating a first selection signal indicating that any one or both signal line of a first pair of combination of reduction signal line and no-reduction signal line is or are not failed when the signal lines are reduced according to the abnormal detection from the abnormal detection unit, and
outputting a second selection signal indicating that any one or both signal line of a second pair of signal lines is or are not failed when a connection of the second selection signal indicating that any one or both signal line of a second pair of signal lines is changed in case of a lane reversal that connects a plurality of signal lines in a down order from a highest bit to a lowest bit of a sending device side with a plurality of signal in a up order from a highest bit to a lowest bit of a reception device side.

20. The control method of the data transfer system according to claim 19, wherein controlling comprises receiving a lane reversal instruction signal that indicates an execution of the lane reversal and selects the plurality of signal lines according to the first, the second selection signals and the lane reversal instruction signal.

* * * * *

UNITED STATES PATENT AND TRADEMARK OFFICE
CERTIFICATE OF CORRECTION

Page 1 of 4

PATENT NO.         : 8,503,292 B2
APPLICATION NO.    : 13/034168
DATED              : August 6, 2013
INVENTOR(S)        : Tomohiro Nagano et al.

Figure 22:
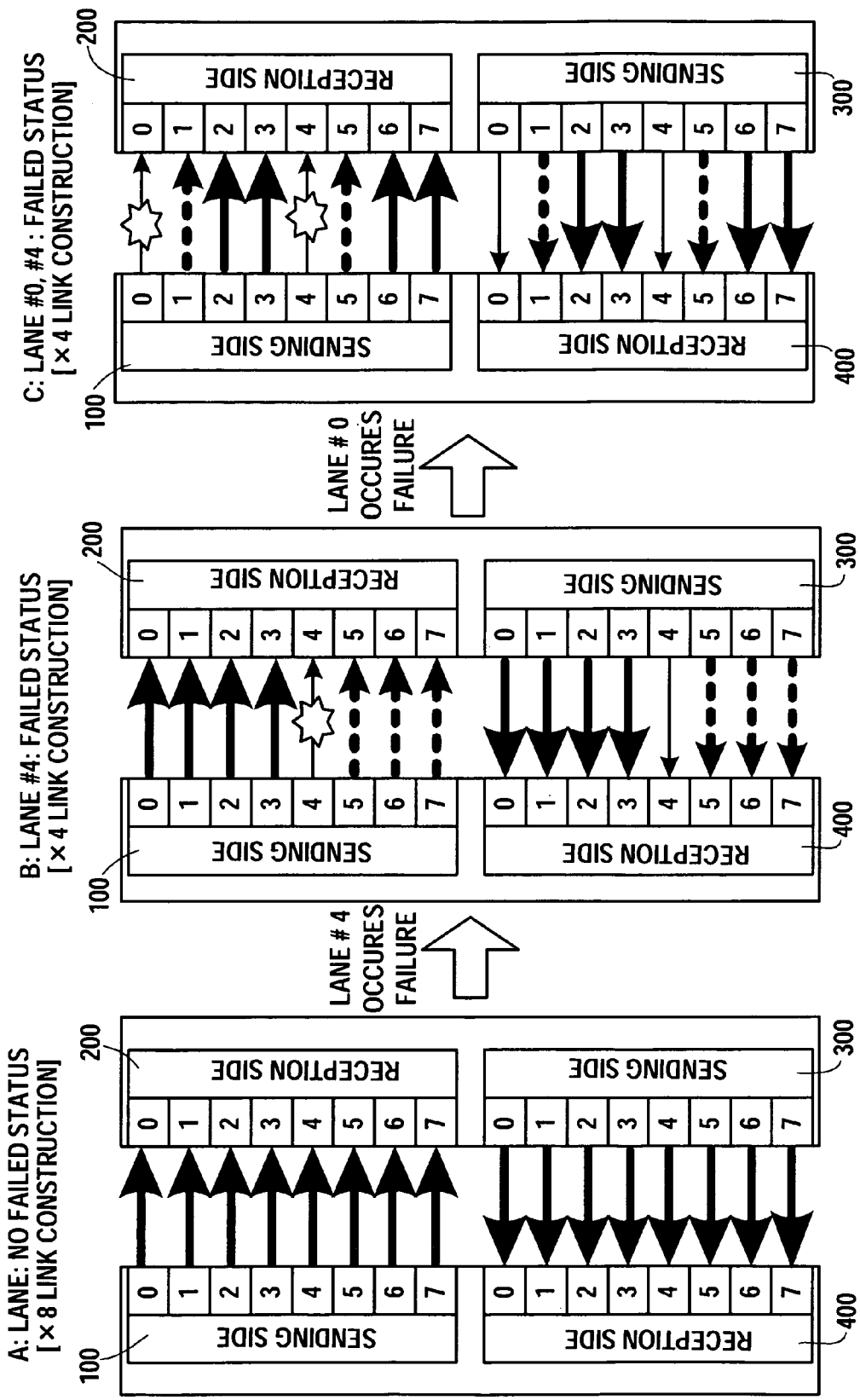
FIG. 22 is an explanatory diagram of another reduction process in a related art.

It is certified that error appears in the above-identified patent and that said Letters Patent is hereby corrected as shown below:

In the Drawings:

Figs. 3, 22 and 26 should be replaced with the attached drawing sheets to correct the spelling of "OCCURES" to "OCCURS" and In Fig. 3 the arrows between 5-7 on the sending side 100 to the reception side 200 in "C: LANE #0" to correspond to the description at column 8, lines 14-23.

Signed and Sealed this
Sixteenth Day of September, 2014

Michelle K. Lee
*Deputy Director of the United States Patent and Trademark Office*